United States Patent
Zhang

(10) Patent No.: US 11,949,469 B2
(45) Date of Patent: Apr. 2, 2024

(54) METHOD AND DEVICE FOR MULTI-ANTENNA TRANSMISSION IN UE AND BASE STATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/138,080

(22) Filed: Apr. 23, 2023

(65) Prior Publication Data

US 2023/0261702 A1    Aug. 17, 2023

Related U.S. Application Data

(63) Continuation of application No. 17/700,507, filed on Mar. 22, 2022, now Pat. No. 11,683,075, which is a
(Continued)

(30) Foreign Application Priority Data

Nov. 24, 2016 (CN) .......................... 201611049893.4

(51) Int. Cl.
*H04B 7/0413* (2017.01)
*H04B 7/0408* (2017.01)
(Continued)

(52) U.S. Cl.
CPC ......... *H04B 7/0413* (2013.01); *H04B 7/0408* (2013.01); *H04B 7/0456* (2013.01);
(Continued)

(58) Field of Classification Search
CPC .. H04B 7/0413; H04B 7/0408; H04B 7/0456; H04B 7/06; H04B 7/0617; H04B 7/0691;
(Continued)

(56) References Cited

U.S. PATENT DOCUMENTS

2011/0217985 A1* 9/2011 Gorokhov ............. H04W 24/10
455/452.2
2014/0184446 A1 7/2014 Park
(Continued)

FOREIGN PATENT DOCUMENTS

| CN | 105323034 A | 2/2016 |
|---|---|---|
| CN | 105429683 A | 3/2016 |
| CN | 105490719 A | 4/2016 |

OTHER PUBLICATIONS

ISR received in application No. PCT/CN2017/108514 dated Nov. 30, 2017.
(Continued)

*Primary Examiner* — Sam K Ahn
*Assistant Examiner* — Amneet Singh

(57) ABSTRACT

The present disclosure provides a method and device for multi-antenna transmission in UE and base station. The user equipment receives a first wireless signal at first; then transmits a second wireless signal, and monitors a first signaling in a first sub-time resource pool. Wherein the first wireless signal is transmitted by K antenna port group(s) and the second wireless signal is used to determine the first antenna port group. The first antenna port group is one of the K antenna port group(s). The first sub-time resource pool is reserved to the first antenna port group, or the index of the first antenna port group is used to determine the first sub-time resource pool. One antenna port group includes positive integer number of antenna ports, and the K is a positive integer greater than 1. The disclosure reduces the
(Continued)

complexity of blind detection of downlink signaling by the UE.

20 Claims, 13 Drawing Sheets

Related U.S. Application Data continuation of application No. 16/420,189, filed on May 23, 2019, now Pat. No. 11,316,563, which is a continuation of application No. PCT/CN2017/108514, filed on Oct. 31, 2017.

(51) Int. Cl.
| | |
|---|---|
| *H04B 7/0456* | (2017.01) |
| *H04B 7/06* | (2006.01) |
| *H04L 5/00* | (2006.01) |
| *H04L 27/26* | (2006.01) |

(52) U.S. Cl.
CPC ............ *H04B 7/06* (2013.01); *H04B 7/0617* (2013.01); *H04L 5/0044* (2013.01); *H04L 5/0048* (2013.01); *H04L 27/2602* (2013.01); *H04L 5/0007* (2013.01); *H04L 27/2676* (2013.01)

(58) Field of Classification Search
CPC ..... H04B 7/086; H04L 5/0044; H04L 5/0048; H04L 27/2602; H04L 5/0007; H04L 27/2676; H04L 5/0023; H04L 5/0094; H04L 5/0053; H04W 72/0446; H04W 72/0453; H04W 72/23
See application file for complete search history.

(56) References Cited

U.S. PATENT DOCUMENTS

2015/0341972 A1* 11/2015 Gruet .................... H04W 4/08
370/329
2017/0289984 A1* 10/2017 Baligh ............. H04W 72/0466

OTHER PUBLICATIONS

First Office Action of Chinses patent application No. CN201611049893.4 dated Dec. 25, 2019.
Notification to Grant Patent Right for Invention of Chinses patent application No. CN201611049893.4 dated Apr. 13, 2020.
Notification to Grant Patent Right for Invention of Chinses patent application No. CN202010297785.9 dated Feb. 19, 2023.

* cited by examiner

METHOD AND DEVICE FOR MULTI-ANTENNA TRANSMISSION IN UE AND BASE STATION

CROSS-REFERENCE TO RELATED APPLICATION

This application is a continuation of the U.S. patent application Ser. No. 17/700,507, filed on Mar. 22, 2022, which is a continuation of the U.S. patent application Ser. No. 16/420,189, filed on May 23, 2019, which is a continuation of International Application No. PCT/CN2017/108514, filed Oct. 31, 2017, claiming the priority benefit of Chinese Patent Application Serial Number 201611049893.4, filed on Nov. 24, 2016, the full disclosure of which is incorporated herein by reference.

BACKGROUND

Technical Field

The present disclosure relates to a transmission method and device in a wireless communication system, and more particularly to a transmission method and device in a wireless communication system that a large number of antennas are deployed at a base station side.

Related Art

Massive MIMO (Multiple-Input Multiple-Output) has become a research hotspot for next-generation mobile communications. In massive MIMO, multiple antennas can improve communication quality by forming narrower beams pointing in a specific direction through beamforming. Both data channel and control channel can improve transmission quality through multi-antenna beamforming.

According to the discussion of 3GPP (3rd Generation Partner Project) RAN1 (Radio Access Network), the hybrid beamforming combining analog beamforming and digital beamforming has become an important research direction of NR (New Radio) system. Since analog beamforming is a wideband operation, control channels using different analog beamforming vectors can only be multiplexed in TDM (Time Division Multiple), that is, it needs to transmit control channels of using different analog beamforming vectors on different time units. If the UE (User Equipment) performs blind detection on the DCI (Downlink Control Information) in each time unit, the number of blind detections times of the DCI by UE is increased, and the complexity of the UE is improved.

SUMMARY

Through research, the inventors found that by establishing a one-to-one correspondence between the time unit and the beamforming vector, each UE only needs to monitor the DCI on the time unit corresponding to the beamforming vector used by itself without blind detection for all the time units, thus reducing the UE complexity.

In view of the above problems, the present disclosure provides a solution. It should be noted that, in the case of no conflict, the features in the embodiments and embodiments in the user equipment of the present disclosure can be applied to the base station, and vice versa. The features of the embodiments and the embodiments of the present disclosure may be combined with each other arbitrarily without conflict.

The present disclosure provides a method for multi-antenna transmission in a user equipment (UE), comprising:
receiving a first wireless signal;
transmitting a second wireless signal; and
monitoring a first signaling in a first sub-time resource pool;
wherein the first wireless signal is transmitted by K antenna port groups; the second wireless signal is used to determine a first antenna port group; the first antenna port group is one of the K antenna port groups; the first sub-time resource pool is reserved for the first antenna port group, or an index of the first antenna port group in the K antenna port groups is used to determine the first sub-time resource pool; one antenna port group includes a positive integer number of antenna port(s); the K is a positive integer greater than 1.

In one embodiment, the foregoing method is advantageous in that, by associating the first sub-time resource pool with the first antenna port group, the UE can quickly determines the location of the first sub-time resource pool in the time domain by the index of the first antenna port group in the K antenna port groups.

In one embodiment, the first signaling is transmitted by the first antenna port group.

In a sub-embodiment of the foregoing embodiment, the first antenna port group comprises L antenna ports, the first signaling comprises L first sub-signaling, the L first sub-signaling carry the same bit block, and the L first sub-signaling are respectively transmitted by the L antenna ports. The bit block includes a positive integer number of bits, and the L is a positive integer.

In one embodiment, the index of the first antenna port group in the K antenna port groups is a non-negative integer less than the K.

In one embodiment, an index of the first antenna port group in the K antenna port groups is used to generate the first signaling.

In one embodiment, a field in the first signaling indicates the index of the first antenna port group in the K antenna port groups.

In one embodiment, the UE determines the time-frequency resource occupied by the first signaling by using a blind detection method.

In one embodiment, the UE determines whether the first signaling is transmitted in the first sub-time resource pool by a blind detection method.

In a sub-embodiment of the foregoing two embodiments, the blind detection means that the UE receives a signal on multiple candidate time-frequency resources and performs a decoding operation, if the correct decoding is determined according to the check bits, the successful reception will be judged, otherwise the failure of reception will be judged.

In one embodiment, the first wireless signal includes one or more of PSS (Primary Synchronization Signal), SSS (Secondary Synchronization Signal), MIB (Master Information Block)/SIB (System Information Block), and CSI-RS (Channel State Information Reference Signal).

In one embodiment, the second wireless signal is used to determine the first antenna port group out of the K antenna port groups.

In one embodiment, the second wireless signal explicitly indicates the first antenna port group.

In one embodiment, the CSI-RS transmitted by one antenna port group belongs to one CSI-RS resource, and the second wireless signal includes a CSI-RSResource Indicator (CRI), the CRI indicates the CSI-RS resource corresponding to the first antenna port group from the CSI-RS resources corresponding to the K antenna port groups.

In one embodiment, the physical layer channel corresponding to the second wireless signal includes an uplink physical layer control channel (i.e., an uplink channel that can only be used to carry uplink physical layer signaling). In a sub-embodiment, the uplink physical layer control channel is a Physical Uplink Control Channel (PUCCH).

In one embodiment, the second wireless signal implicitly indicates the first antenna port group.

In one embodiment, the second wireless signal is a RACH preamble, and at least one of the sequences of the RACH preamble and the time-frequency resource occupied by the RACH preamble is used to determine the first antenna port group.

In one embodiment, the physical layer channel corresponding to the second wireless signal includes Physical Random Access CHannel (PRACH).

In one embodiment, the first signaling is physical layer signaling.

In one embodiment, the first signaling is non-UE-specific.

In one embodiment, the first signaling is transmitted on the downlink physical layer control channel (i.e., a downlink channel that can only be used to carry physical layer signaling).

In a sub-embodiment of the foregoing embodiment, the downlink physical layer control channel is Physical Downlink Control Channel (PDCCH).

In one embodiment, one antenna port is formed by superposing multiple antennas through antenna virtualization, and the mapping coefficients of the multiple antennas to the one antenna port constitute a beamforming vector corresponding to the one antenna port.

In a sub-embodiment of the foregoing embodiment, the beamforming vectors corresponding to any two different antenna ports cannot be assumed to be the same.

In a sub-embodiment of the foregoing embodiment, the UE cannot perform joint channel estimation utilizing reference signals transmitted by two different antenna ports.

In one embodiment, the number of antenna ports included in different antenna port groups is the same.

In one embodiment, the number of antenna ports included in at least two different antenna port groups is different.

In one embodiment, the reference signals transmitted by any two different antenna port groups of the K antenna port groups have the identical pattern within the time-frequency resource block.

In a sub-embodiment of the foregoing embodiment, the time-frequency resource block is Physical Resource Block Pair (PRBP).

In a sub-embodiment of the foregoing embodiment, the time-frequency resource block occupies W subcarriers in the frequency domain and occupies a wideband symbol in the time domain. The W is a positive integer greater than 1. In a sub-embodiment of this sub-embodiment, the wideband symbol is one of OFDM symbol, SC-FDMA symbol, SCMA symbol.

Specifically, according to one aspect of the present disclosure, the method further comprises:
receiving first information,
wherein the first information is used to determine a first time resource pool, the first time resource pool comprises K sub-time resource pools, the K sub-time resource pools are respectively reserved to the K antenna port groups, the first sub-time resource pool is one of the K sub-time resource pools, any two sub-time resource pools of the K sub-time resource pools are orthogonal on the time domain.

In one embodiment, the advantage of the foregoing method is that by establishing a one-to-one correspondence association between the K sub-time resource pools and the K antenna port groups, and the association is notified to the UE by the first information. The UE only needs to monitor the downlink signaling on the first sub-time resource pool instead of monitoring the downlink signaling on all the K sub-time resource pools, thereby reducing the complexity of blind detection of the DCI by the UE.

In one embodiment, another advantage of the foregoing method is that the K sub-time resource pools are respectively reserved to the K antenna port groups, so that the base station can perform beamforming on the downlink signaling by using any beamforming vector. It ensures that the UE in any direction can receive downlink signaling.

In one embodiment, there is no one antenna port belonging to two different antenna port groups of the K antenna port groups at the same time.

In one embodiment, the UE does not monitor downlink signaling in the sub-time resource pool except the first sub-time resource pool in the first time resource pool.

In one embodiment, the first information is respectively transmitted once by the K antenna port groups (i.e., the first information is transmitted K times).

In a sub-embodiment of the foregoing embodiment, the first information includes K first sub-information, the K first sub-information carry the same bit block, and the K first sub-information are respectively transmitted by the K antenna port groups, the time domain resources occupied by the different first sub-information are orthogonal to each other. The bit block includes a positive integer number of bits.

In one embodiment, the first information is carried by higher layer signaling.

In a sub-embodiment of the foregoing embodiment, the first information includes one or more Radio Resource Control (RRC) Information Element (IE).

In one embodiment, the first information is cell-common.

In one embodiment, the first information is transmitted on a broadcast channel (i.e., a downlink channel that can only be used to carry broadcast signals).

In a sub-embodiment of the foregoing embodiment, the broadcast channel includes a Physical Broadcast Channel (PBCH).

In one embodiment, any one of the K sub-time resource pools is non-contiguous in the time domain.

Specifically, according to one aspect of the present disclosure, the method further comprises:
receiving second information; and
monitoring a first signaling on a second time resource pool.
wherein the second information is used to determine the second time resource pool; and the second time resource pool and the index of the first antenna port group in the K antenna port groups are independent.

In one embodiment, the advantages of the foregoing method is that the base station can arbitrarily determine the beamforming vector used on the second time resource pool according to the scheduling requirement, thereby improving the flexibility of the base station scheduling.

In one embodiment, the second time resource pool and the first time resource pool are orthogonal in the time domain.

In one embodiment, the second time resource pool is non-contiguous in the time domain.

In one embodiment, the first information and the second information are both dynamically configured.

In one embodiment, the first information and the second information belong to one Downlink Control Information (DCI).

In one embodiment, the first information and the second information are both semi-statically configured.

In one embodiment, the first information and the second information are both for a given terminal group, the UE is one terminal in the given terminal group, and the given terminal group includes a positive integer number of terminals.

In one embodiment, the first information and the second information are both common to the cell.

In one embodiment, if the first signaling is transmitted on the second time resource pool, the first signaling includes a first domain; if the first signaling is transmitted on the first sub-time resource pool, the first signaling lacks the first domain.

In a sub-embodiment of the foregoing embodiment, the second time resource pool is allocated to any one of the K antenna port groups. The first domain indicates an index of the antenna port group corresponding to the second time resource pool in the K antenna port groups.

In one embodiment, the UE determines whether the first signaling is transmitted in the second time resource pool by using a blind detection method.

In one embodiment, the second time resource pool includes T time windows, and the T time windows are orthogonal to each other in the time domain. The first time window corresponds to M1 antenna ports, and the second time window corresponds to M2 antenna ports. The first time window and the second time window are respectively any two time windows of the T time windows. The T, the M1 and the M2 are positive integers, respectively.

In a sub-embodiment of the foregoing embodiment, at least one antenna port in the M1 antenna ports does not belong to the M2 antenna ports.

In a sub-embodiment of the foregoing embodiment, at least one antenna port in the M2 antenna ports does not belong to the M1 antenna ports.

In a sub-embodiment of the foregoing embodiment, at least two antenna ports in the M1 antenna ports belong to different antenna port groups in the K antenna port groups.

In a sub-embodiment of the foregoing embodiment, the first signaling is transmitted in the first time window. The first signaling is transmitted by M3 antenna ports, the M3 antenna ports are a subset of the M1 antenna ports, the M1 is a positive integer, and the M3 is a positive integer less than or equal to M1.

In one embodiment, the second information is respectively transmitted once by the K antenna port groups (i.e., the second information is transmitted K times).

In a sub-embodiment of the foregoing embodiment, the second information includes K second sub-information, the K second sub-information carry the same bit block, the K second sub-information are respectively transmitted by the K antenna port groups, and the time domain resources occupied by the two different second sub-information are orthogonal to each other. The bit block includes a positive integer number of bits Specifically, according to one aspect of the present disclosure, the method further comprises:

monitoring a second signaling in a third time resource pool;

wherein the first signaling is used to determine at least one of the third time resource pool, the number of transmitting antenna port(s) of the second signaling, and the transmitting antenna port(s) of the second signaling.

In an embodiment, the first signaling further indicates an antenna port for receiving the second signaling.

In one embodiment, the first signaling explicitly indicates at least one of the third time resource pool, the number of transmitting antenna port(s) of the second signaling, and the transmitting antenna port(s) of the second signaling.

In one embodiment, the first signaling implicitly indicates at least one of the third time resource pool, the number of transmitting antenna port(s) of the second signaling, and the transmitting antenna port(s) of the second signaling.

In one embodiment, the second signaling is physical layer signaling.

In one embodiment, the second signaling is UE-specific.

In one embodiment, the second signaling is transmitted on a downlink physical layer control channel (i.e., a downlink channel that can only be used to carry physical layer signaling).

In a sub-embodiment of the foregoing embodiment, the downlink physical layer control channel is a PDCCH.

In a sub-embodiment of the foregoing embodiment, the downlink physical layer control channel is a sPDCCH (short PDCCH).

In one embodiment, the second signaling is a DCI.

In one embodiment, the second signaling is a fast DCI.

In one embodiment, the third time resource pool is non-contiguous in the time domain.

In one embodiment, the time domain resources occupied by the third time resource pool and the time domain resources occupied by the first time resource pool and the time domain resources occupied by the second time resource pool are orthogonal to each other.

Specifically, according to one aspect of the present disclosure, the method further comprises:

receiving K1 reference signals;

wherein the K1 reference signals are respectively transmitted by K1 antenna ports; the first signaling is used to determine at least one of the K1, the K1 antenna ports and the air interface resources occupied by the K1 reference signals; or the index of the first antenna port group in the K antenna port groups is used to determine at least one of the air interface resources occupied by the K1 reference signals and the RS sequences corresponding to the K1 reference signals; the air interface resources occupied by the K1 reference signals include one or more of time domain resources, frequency domain resources, and code domain resources.

In one embodiment, the K1 reference signals are respectively CSI-RSs.

In one embodiment, the time domain resources occupied by any two of the K1 reference signals are orthogonal.

In one embodiment, any two of the K1 reference signals occupy the same time domain resources and orthogonal frequency domain resources.

In one embodiment, the RS sequences corresponding to the K1 reference signals includes a pseudo random sequence.

In one embodiment, the RS sequences corresponding to the K1 reference signals includes a Zadoff-Chu sequence.

Specifically, according to one aspect of the present disclosure, the method further comprises:

operating a third wireless signal;

wherein the first signaling is used to determine a fourth time resource pool; the time domain resources occupied by the third wireless signal belongs to the fourth time resource pool; the operating is receiving; or the operating is transmitting.

In one embodiment, the third wireless signal carries physical layer data.

In an embodiment, the second signaling indicates a frequency domain resources occupied by the third wireless signal.

In one embodiment, the second signaling indicates a time domain resources occupied by the third wireless signal from the fourth time resource pool.

In one embodiment, the third wireless signal includes at least one of physical layer signaling, physical layer data.

In one embodiment, the second signaling includes scheduling information of the third wireless signal, and the scheduling information of the third wireless signal includes at least one of the MCS (Modulation and Coding Scheme), NDI (New Data Indicator), RV (Redundancy Version) and HARQ (Hybrid Automatic Repeat reQuest) process number.

In one embodiment, the transmitting antenna port(s) of the second signaling and the transmitting antenna port(s) of the third wireless signal are the same, the operating is receiving.

In one embodiment, the fourth time resource pool is the third time resource pool, the operating is receiving.

In one embodiment, the fourth time resource pool includes the third time resource pool, the operating is receiving.

In one embodiment, the fourth time resource pool is non-contiguous in the time domain.

In one embodiment, the physical layer channel corresponding to the third wireless signal includes a downlink physical layer data channel (i.e., a downlink channel that can be used to carry physical layer data), the operating is receiving.

In a sub-embodiment of the foregoing embodiment, the downlink physical layer data channel is a PDSCH.

In an embodiment, the transmitting channel corresponding to the third wireless signal is a DL-SCH.

In one embodiment, the physical layer channel corresponding to the third wireless signal includes an uplink physical layer data channel (i.e., an uplink channel that can be used to carry physical layer data), and the operating is transmitting.

In a sub-embodiment of the foregoing embodiment, the uplink physical layer data channel is a PUSCH.

In one embodiment, the transmitting channel corresponding to the third wireless signal is a UL-SCH.

Specifically, according to one aspect of the present disclosure, the method further comprises:
receiving third information;
wherein the third information is used to determine the first antenna port group.

In one embodiment, the third information is carried by higher layer signaling.

In a sub-embodiment of the foregoing embodiment, the third information is carried by the RRC layer signaling.

In one embodiment, the third information is carried by physical layer signaling.

In one embodiment, the third information is UE-specific.

In one embodiment, the third information is transmitted on a physical layer control channel.

In one embodiment, the third information is transmitted on a physical layer data channel.

In one embodiment, the third information is respectively transmitted once by the K antenna port groups (i.e., the first information is transmitted K times).

In a sub-embodiment of the foregoing embodiment, the third information includes K downlink sub-information, the K downlink sub-information carry the same bit block, and the K downlink sub-information is respectively transmitted by the K antenna port groups, the time domain resources occupied by two different downlink sub-information are orthogonal to each other. The bit block includes a positive integer number of bits.

The present disclosure provides a method for multi-antenna transmission in a base station, comprising:
transmitting a first wireless signal;
receiving a second wireless signal; and
transmitting or abandoning transmitting a first signaling in the first sub-time resource pool;
wherein the first wireless signal is transmitted by K antenna port groups; the second wireless signal is used to determine a first antenna port group; the first antenna port group is one of the K antenna port groups; the first sub-time resource pool is reserved to the first antenna port group; or the index of the first antenna port group in the K antenna port groups is used to determine the first sub-time resource pool; one antenna port group includes a positive integer number of antenna ports; and the K is a positive integer greater than 1.

In one embodiment, the first signaling is transmitted by the first antenna port group.

In one embodiment, a reference signal transmitted by any two different antenna port groups in the K antenna port groups have the identical pattern within the time-frequency resource block.

Specifically, according to one aspect of the present disclosure, the method further comprises:
transmitting first information;
wherein the first information is used to determine a first time resource pool; the first time resource pool comprises K sub-time resource pools; and the K sub-time resource pools are respectively reserved to the K antenna port groups; the first sub-time resource pool is one of the K sub-time resource pools; and any two sub-time resource pools of the K sub-time resource pools are orthogonal on the time domain.

In one embodiment, the first signaling is respectively transmitted once in the K sub-time resource pools (i.e., the first signaling is transmitted K times).

In a sub-embodiment of the foregoing embodiment, the first signaling is transmitted by a given antenna port group in a given sub-time resource pool, wherein the given sub-time resource pool is any one of the K sub-time resource pools; the given antenna port group is an antenna port group corresponding to the given sub-time resource pool in the K antenna port groups.

In one embodiment, the first information is respectively transmitted once by the K antenna port groups (i.e., the first information is transmitted K times).

In a sub-embodiment of the foregoing embodiment, the first information includes K first sub-information, the K first sub-information carry the same bit block, the K first sub-information are respectively transmitted by the K antenna port groups, the time domain resources occupied by the different first sub-information are orthogonal to each other. The bit block includes a positive integer number of bits.

In one embodiment, any one of the K sub-time resource pools is non-contiguous in the time domain.

Specifically, according to one aspect of the present disclosure, the method further comprises:
transmitting second information; and
transmitting or abandoning transmitting the first signaling on a second time resource pool;
wherein the second information is used to determine the second time resource pool; the second time resource pool and the index of the first antenna port group in the K antenna port groups are independent.

In one embodiment, the second information is respectively transmitted once by the K antenna port groups (i.e., the second information is transmitted K times).

In a sub-embodiment of the foregoing embodiment, the second information includes K second sub-information, the K second sub-information carry the same bit block, and the K second sub-information are respectively transmitted by the K antenna port groups, and the time domain resources occupied by the different second sub-information are orthogonal to each other. The bit block includes a positive integer number of bits.

Specifically, according to one aspect of the present disclosure, the method further comprises:

transmitting second signaling in a third time resource pool;

wherein the first signaling is used to determine at least one of the third time resource pool, the number of transmitting antenna port(s) of the second signaling and the transmitting antenna port(s) of the second signaling.

In one embodiment, the first signaling further indicates the antenna port for receiving the second signaling.

Specifically, according to one aspect of the present disclosure, the method further comprises:

transmitting K1 reference signals;

wherein the K1 reference signals are respectively transmitted by K1 antenna ports; the first signaling is used to determine at least one of the K1, the K1 antenna ports and the air interface resources occupied by the K1 reference signals; or the index of the first antenna port group in the K antenna port groups is used to determine at least one of the air interface resources occupied by the K1 reference signals and the RS sequences corresponding to the K1 reference signals}; the air interface resources occupied by the K1 reference signals include one or more of {time domain resources, frequency domain resources, and code domain resources.

In one embodiment, the K1 reference signals are respectively CSI-RSs.

Specifically, according to one aspect of the present disclosure, the method further comprises:

performing a third wireless signal;

wherein the first signaling is used to determine a fourth time resource pool; the time domain resources occupied by the third wireless signal belongs to the fourth time resource pool; the performing is transmitting; or the performing is receiving.

In one embodiment, the second signaling indicates frequency domain resources occupied by the third wireless signal.

In one embodiment, the second signaling indicates time domain resources occupied by the third wireless signal from the fourth time resource pool.

In one embodiment, the second signaling includes scheduling information of the third wireless signal, and the scheduling information of the third wireless signal includes at least one of MCS, NDI, RV, and HARQ process number.

In one embodiment, the transmitting antenna port(s) of the second signaling and the transmitting antenna port(s) of the third wireless signal are the same, and the performing is transmitting.

Specifically, according to one aspect of the present disclosure, the method further comprises:

transmitting third information;

wherein the third information is used to determine the first antenna port group.

The present disclosure provides a user equipment for multi-antenna transmission, comprises:

a first receiver, receiving a first wireless signal;

a first transmitter, transmitting a second wireless signal; and a second receiver, monitoring a first signaling in a first sub-time resource pool;

wherein the first wireless signal is transmitted by K antenna port groups; the second wireless signal is used to determine a first antenna port group; the first antenna port group is one of the K antenna port groups; the first sub-time resource pool is reserved to the first antenna port group; or the index of the first antenna port group in the K antenna port groups is used to determine the first sub-time resource pool; one antenna port group includes a positive integer number of antenna ports; and the K is a positive integer greater than 1.

In one embodiment of the user equipment, the first receiver further receives the first information, wherein the first information is used to determine the first time resource pool, the first time resource pool comprises K sub-time resource pools. The K sub-time resource pools are respectively reserved to the K antenna port groups. The first sub-time resource pool is one of the K sub-time resource pools. Any two of the K sub-time resource pools are orthogonal on the time domain.

In one embodiment of the user equipment, the first receiver further receives the second information. Wherein the second information is used to determine a second time resource pool; the second time resource pool and the index of the first antenna port group in the K antenna port groups are independent.

In one embodiment of the user equipment, the second receiver further monitors the first signaling on the second time resource pool.

In one embodiment of the user equipment, the first receiver further receives third information. The third information is used to determine the first antenna port group.

In one embodiment, the user equipment further comprises:

a third receiver, monitoring a second signaling in a third time resource pool;

wherein the first signaling is used to determine at least one of the third time resource pool, the number of transmitting antenna port(s) of the second signaling and the transmitting antenna port(s) of the second signaling.

In one embodiment of the user equipment, the third receiver further receives K1 reference signals, wherein the K1 reference signals are respectively transmitted by K1 antenna ports; the first signaling is used to determine at least one of the K1, the K1 antenna ports and the air interface resources occupied by the K1 reference signals; or the index of the first antenna port group in the K antenna port groups is used to determine at least one of the air interface resources occupied by the K1 reference signals and the RS sequences corresponding to the K1 reference signals; the air interface resources occupied by the K1 reference signals include one or more of time domain resources, frequency domain resources, and code domain resources.

In one embodiment, the user equipment further comprises:

a first processor, operating a third wireless signal;

wherein the first signaling is used to determine a fourth time resource pool; the time domain resources occupied by the third wireless signal belongs to the fourth time resource pool; the operating is receiving; or the operating is transmitting.

The present disclosure provides a base station device for multi-antenna transmission, comprises:

a second transmitter, transmitting a first wireless signal;
a fourth receiver, receiving a second wireless signal; and
a third transmitter, transmitting a first signaling in a first sub-time resource pool;
wherein the first wireless signal is transmitted by K antenna port groups; the second wireless signal is used to determine a first antenna port group; the first antenna port group is one of the K antenna port groups; the first sub-time resource pool is reserved to the first antenna port group; or the index of the first antenna port group in the K antenna port groups is used to determine the first sub-time resource pool; one antenna port group includes a positive integer number of antenna ports; and the K is a positive integer greater than 1.

In one embodiment, the base station device includes the second transmitter which further transmitting first information, wherein the first information is used to determine a first time resource pool; the first time resource pool comprises K sub-time resource pools; and the K sub-time resource pools are respectively reserved to the K antenna port groups; the first sub-time resource pool is one of the K sub-time resource pools; and any two sub-time resource pools of the K sub-time resource pools are orthogonal in the time domain.

In one embodiment, the base station device comprises the second transmitter which further transmitting the second information. The second information is used to determine a second time resource pool. The second time resource pool and the index of the first antenna port group in the K antenna port groups are independent.

In one embodiment, the base station device comprises the third transmitter which further transmitting the first signaling on the second time resource pool.

In one embodiment, the base station device comprises the second transmitter which further transmitting third information. The third information is used to determine the first antenna port group.

In one embodiment, the base station device further comprises:

a fourth transmitter, transmitting a second signaling in a third time resource pool;
wherein, the first signaling is used to determine at least one of the third time resource pool, the number of transmitting antenna port(s) of the second signaling and the transmitting antenna port(s) of the second signaling.

In one embodiment, the base station device comprises the fourth transmitter which further transmitting K1 reference signals. The K1 reference signals are respectively transmitted by K1 antenna ports, and the first signaling is used to determine at least one of the K1, the K1 antenna ports, the air interface resources occupied by the K1 reference signals; or the index of the first antenna port group in the K antenna port groups is used to determine at least one of the air interface resources occupied by the K1 reference signals and the RS sequences corresponding to the K1 reference signals; the air interface resources occupied by the K1 reference signals include one or more of time domain resources, frequency domain resources, and code domain resources.

In one embodiment, the base station device further comprises:

a second processor, performing a third wireless signal;
wherein the first signaling is used to determine a fourth time resource pool; the time domain resources occupied by the third wireless signal belongs to the fourth time resource pool; the performing is transmitting; or the performing is receiving.

Compared with the traditional method, the present disclosure has the following advantages:

A one-to-one correspondence relationship is established between the K sub-time resource pools and the K antenna port groups, so that the base station can use any beamforming vector to transmit a downlink signaling, which ensures that the UE in any direction can receive a downlink signaling.

The UE learns the one-to-one correspondence relationship between the K sub-time resource pools and the K antenna port groups through the first information, so the UE only needs to monitor the downlink signaling on the sub-time resource pool corresponding to the beamforming vector used by itself, instead of monitoring downlink signaling on all K sub-time resource pools, thereby reducing the complexity of blind detection of DCI by the UE.

By configuring the second time resource pool, the base station can use any beamforming vector to transmit downlink signaling on the second time resource pool according to the scheduling requirement, thereby improving the flexibility of the base station scheduling.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

Embodiment 1

Figure 1:
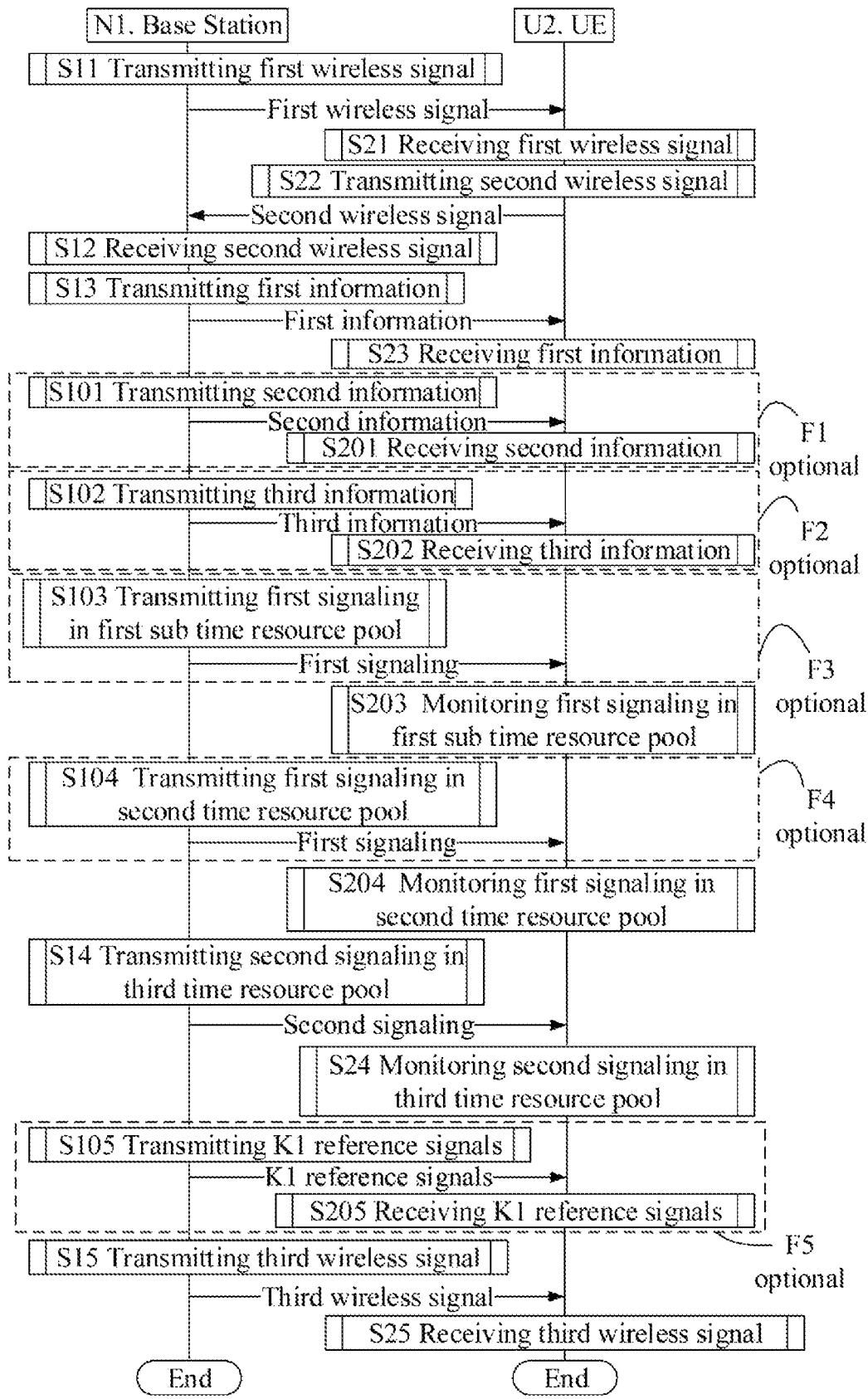
FIG. 1 illustrates a flowchart of wireless transmission according to one embodiment of the present disclosure.

Embodiment 1 illustrates a flow chart of wireless transmission, as shown in FIG. 1. In FIG. 1, the base station N1 is a maintenance base station of a serving cell of the user equipment U2. In the figure, the step in the box identified as F1, F2, F3, F4, and F5 are optional, respectively. The step in the box F3 and the step in the box F4 must choose one of two. If the step in the box identified as F4 exists, then the step in the box identified as F1 also exists.

For N1, in step S11, transmitting the first wireless signal; in step S12, receiving the second wireless signal; in step S13, transmitting the first information; in step S101, transmitting the second information; in step S102, transmitting the third information; in step S103, transmitting the first signaling in the first sub-time resource pool; in step S104, transmitting the first signaling in the second time resource pool; in step S14, transmitting the second signaling in the third time resource pool; in step S105, transmitting the K1 reference signals; in step S15, transmitting the third wireless signal.

For U2, in step S21, receiving the first wireless signal; in step S22, transmitting the second wireless signal; in step S23, receiving the first information; in step S201, receiving the second information; in step S202, receiving the third information; in step S203, monitoring the first signaling in the first sub-time resource pool; in step S204, monitoring the first signaling in the second time resource pool; in step S24, monitoring the second signaling in the third time resource pool; in step S205, receiving the K1 reference signals; in step S25, receiving the third wireless signal.

In Embodiment 1, the first wireless signal is transmitted by K antenna port groups, and the second wireless signal is used by the N1 to determine a first antenna port group. The first antenna port group is one of the K antenna port groups. The first sub-time resource pool is reserved to the first antenna port group; or an index of the first antenna port group in the K antenna port group is used by the N1 and the U2 for determining the first sub-time resource pool. One antenna port group includes a positive integer number of antenna ports, and K is a positive integer greater than 1. The first information is used by U2 for determining the first time resource pool, the first time resource pool comprises K sub-time resource pools. The K sub-time resource pools are reserved to the K antenna port groups. The first sub-time resource pool is one of the K sub-time resource pools. Any two of the K sub-time resource pools are orthogonal on the time domain. The second information is used by the U2 to determine the second time resource pool. The second time resource pool and the index of the first antenna port group in the K antenna port groups are independent. The first signaling is further used by the U2 to determine at least one of the third time resource pool, the number of transmit antenna ports of the second signaling, and the transmit antenna port of the second signaling. The K1 reference signals are respectively transmitted by K1 antenna ports, and the first signaling is used by the U2 to determine at least one of the K1, the K1 antenna ports, and the air interface resources occupied by the K1 reference signals. Or the index of the first antenna port group in the K antenna port groups is used by the U2 to determine at least one of the air interface resources occupied by the K1 reference signals, the RS sequences corresponding to K1 reference signals. The air interface resources occupied by the K1 reference signals comprises one or more time domain resources, frequency resources, code domain in resource. The time domain resources occupied by the third wireless signal belongs to a fourth time resource pool, and the first signaling is used by the U2 to determine the fourth time resource pool. The third information is used by the U2 to determine the first antenna port group.

In one embodiment, the first signaling is transmitted by the first antenna port group.

In one embodiment, the U2 determines the time-frequency resource occupied by the first signaling by using a blind detection method.

In one embodiment, the U2 determines whether the first signaling is transmitted in the first sub-time resource pool by a blind detection method.

In one embodiment, the first wireless signal includes one or more of PSS, SSS, MIB/SIB, CSI-RS.

In one embodiment, a CSI-RS transmitted by one antenna port group belongs to one CSI-RS resource, and the second wireless signal includes a CRI, the CRI indicates a CSI-RS resource corresponding to the first antenna port group from a CSI-RS resource corresponding to the K antenna port groups.

In one embodiment, the second wireless signal is a RACH preamble, and at least one of the sequences of the RACH preamble and the time-frequency resource occupied by the RACH preamble is used by the N1 to determine the first antenna port group.

In one embodiment, the first signaling is physical layer signaling.

In one embodiment, the first signaling is non-UE-specific.

In one embodiment, an antenna port is formed by superposing multiple antennas through antenna virtualization, and mapping coefficients of the multiple antennas to the one antenna port constitute a beamforming vector corresponding to the one antenna port.

In a sub-embodiment of the foregoing embodiment, the beamforming vectors corresponding to any two different antenna ports cannot be assumed to be the same.

In a sub-embodiment of the foregoing embodiment, the U2 cannot perform joint channel estimation using reference signals transmitted by two different antenna ports.

In one embodiment, the U2 does not monitor downlink signaling in the sub-time resource pool except the first sub-time resource pool in the first time resource pool.

In one embodiment, the first information is respectively transmitted once by the K antenna port groups (i.e., the first information is transmitted K times).

In a sub-embodiment of the foregoing embodiment, the first information includes K first sub-information, the K first sub-information carry the same bit block, and the K first sub-information are respectively transmitted by the K antenna port groups, the time domain resources occupied by the different first sub-information are orthogonal to each other. The bit block includes a positive integer number of bits.

In one embodiment, the first information is carried by higher layer signaling.

In one embodiment, the first information is common to the cell.

In one embodiment, the U2 determines whether the first signaling is transmitted in the second time resource pool by using blind detection method.

In one embodiment, the second information is transmitted once by the K antenna port groups (i.e., the second information is transmitted K times).

In a sub-embodiment of the foregoing embodiment, the second information includes K second sub-information, the K second sub-information carry the same bit block, the K second sub-information are respectively transmitted by the K antenna port groups, the time domain resources occupied by the two different second sub-information are orthogonal to each other. The bit block includes a positive integer number of bits.

In one embodiment, the first signaling further indicates an antenna port for receiving the second signaling.

In one embodiment, the second signaling is physical layer signaling.

In one embodiment, the second signaling is UE-specific.

In one embodiment, the K1 reference signals are respectively CSI-RSs.

In an embodiment, the second signaling indicates frequency domain resources occupied by the third wireless signal.

In one embodiment, the second signaling indicates time domain resources occupied by the third wireless signal from the fourth time resource pool.

In one embodiment, the third wireless signal includes at least one of physical layer signaling, physical layer data.

In one embodiment, the second signaling includes scheduling information of the third wireless signal, and the scheduling information of the third wireless signal includes at least one of MCS, NDI, RV, or HARQ process number.

In one embodiment, the transmitting antenna port(s) of the second signaling and the transmitting antenna port(s) of the third wireless signal are the same.

Embodiment 2

Figure 2:
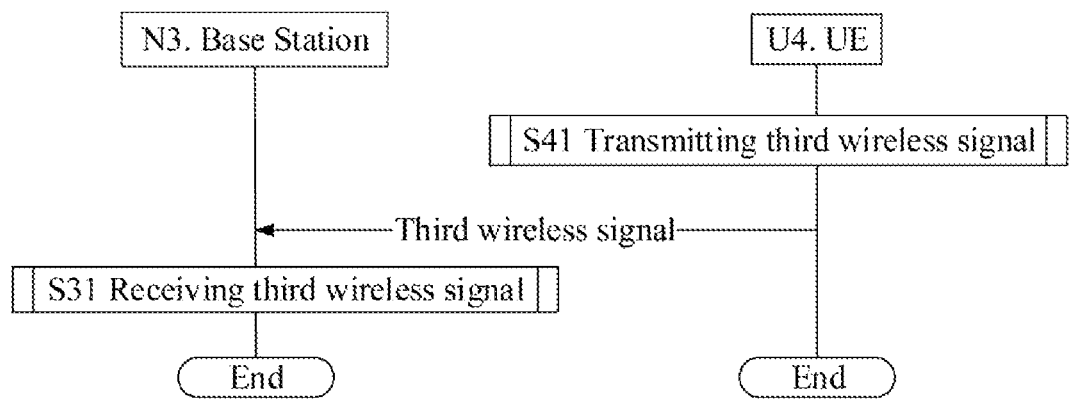
FIG. 2 illustrates a flowchart of wireless transmission according to another one embodiment of the present disclosure.

Embodiment 2 illustrates a schematic diagram of network architecture, as shown in FIG. 2. In FIG. 2, the base station N3 is a maintenance base station of the serving cell of the user equipment U4. In Embodiment 2, the N3 can reuse steps S11-S14 and steps S101-S105 in FIG. 1; the U4 can reuse steps S21-S24 and steps S201-S205 in FIG. 1.

For N3, a third wireless signal is received in step S31.

For U4, a third wireless signal is transmitted in step S41.

Embodiment 3

Figure 3:
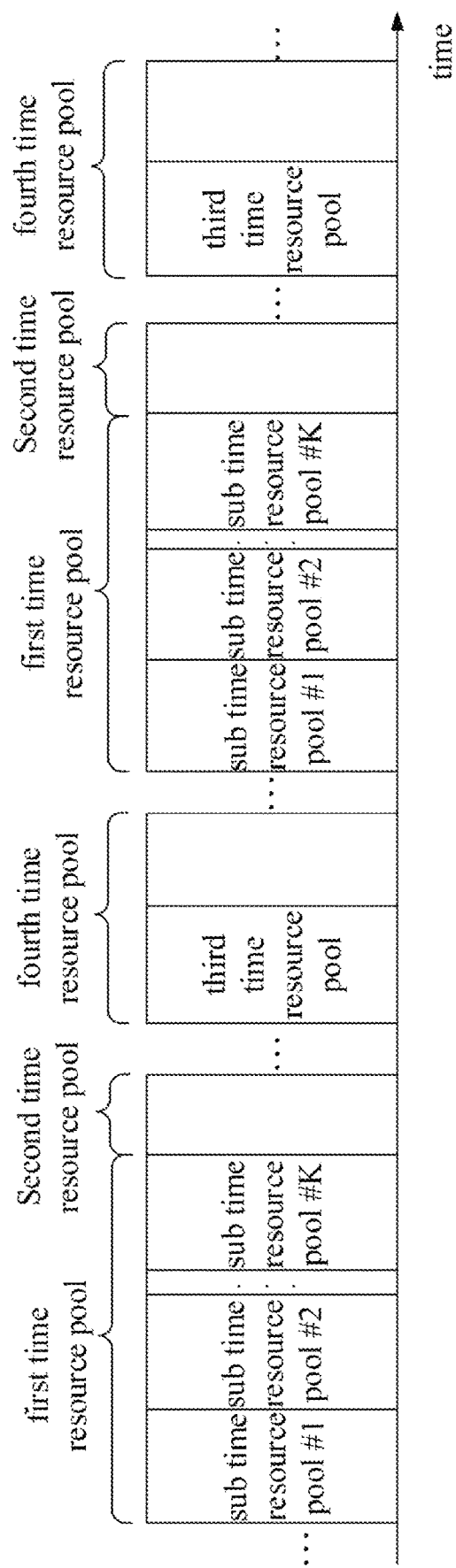
FIG. 3 illustrates a schematic diagram of resource mapping in a time domain of a first time resource pool, a second time resource pool, a third time resource pool, and a fourth time resource pool according to one embodiment of the present disclosure.

Embodiment 3 exemplifies a resource mapping of the first time resource pool, the second time resource pool, the third time resource pool, and the fourth time resource pool in the time domain, as shown in FIG. 3.

In Embodiment 3, the first time resource pool includes K sub-time resource pools, and any two of the K sub-time resource pools are orthogonal in the time domain. The fourth time resource pool includes the third time resource pool. The first time resource pool, the second time resource pool and the fourth time resource pool are orthogonal to each other in the time domain. The operating in this disclosure is receiving, and the operating in this disclosure is transmitting.

In one embodiment, any one of the K sub-time resource pools is non-contiguous on the time domain.

In one embodiment, the second time resource pool is non-contiguous on the time domain.

In one embodiment, the third time resource pool is non-contiguous on the time domain.

In one embodiment, the fourth time resource pool is non-contiguous on the time domain.

Embodiment 4

Figure 4:
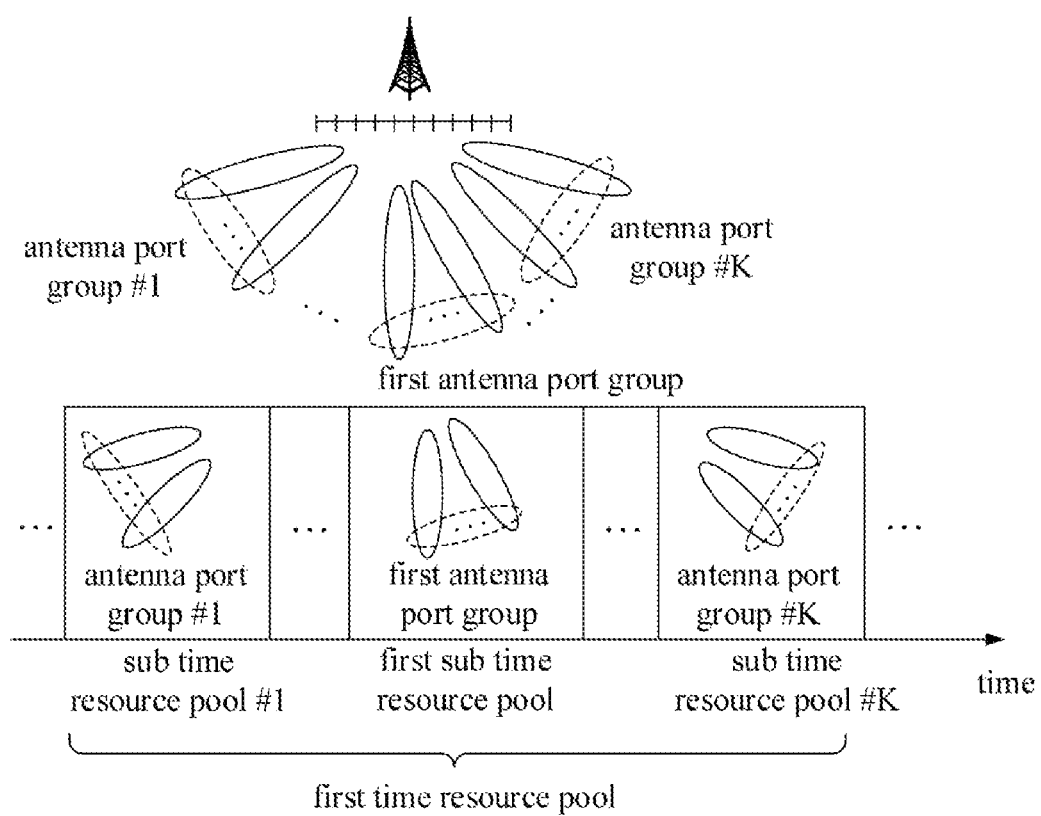
FIG. 4 illustrates a schematic diagram of a one-to-one correspondence relationship between K sub-time resource pools and K antenna port groups according to one embodiment of the present disclosure.

Embodiment 4 illustrates a schematic diagram of the correspondence relationship between K sub-time resource pools and K antenna port groups, as shown in FIG. 4.

In Embodiment 4, the K sub-time resource pools are respectively reserved to the K antenna port groups. The first sub-time resource pool is reserved to the first antenna port group; or the index of the first antenna port group in the K antenna port groups is used by the base station in the present disclosure and the UE in the present disclosure to determine the first sub-time resource pool. The first sub-time resource pool is one of the K sub-time resource pools, and the first antenna port group is one of the K antenna port groups. One antenna port group includes a positive integer number of antenna ports, and the K is a positive integer greater than 1.

In one embodiment, the number of antenna ports included in different antenna port groups is the same.

In one embodiment, the numbers of antenna ports included in at least two different antenna port groups are different.

In one embodiment, an antenna port is formed by superposing multiple antennas through antenna virtualization, and mapping coefficients of the multiple antennas to the one antenna port constitute a beamforming vector corresponding to the one antenna port.

In a sub-embodiment of the foregoing embodiment, the beamforming vectors corresponding to any two different antenna ports cannot be assumed to be the same.

In a sub-embodiment of the foregoing embodiment, the UE cannot perform joint channel estimation using reference signals transmitted by two different antenna ports.

In one embodiment, there is no one antenna port belonging to two different antenna port groups of the K antenna port groups at the same time.

Embodiment 5

Figure 5:
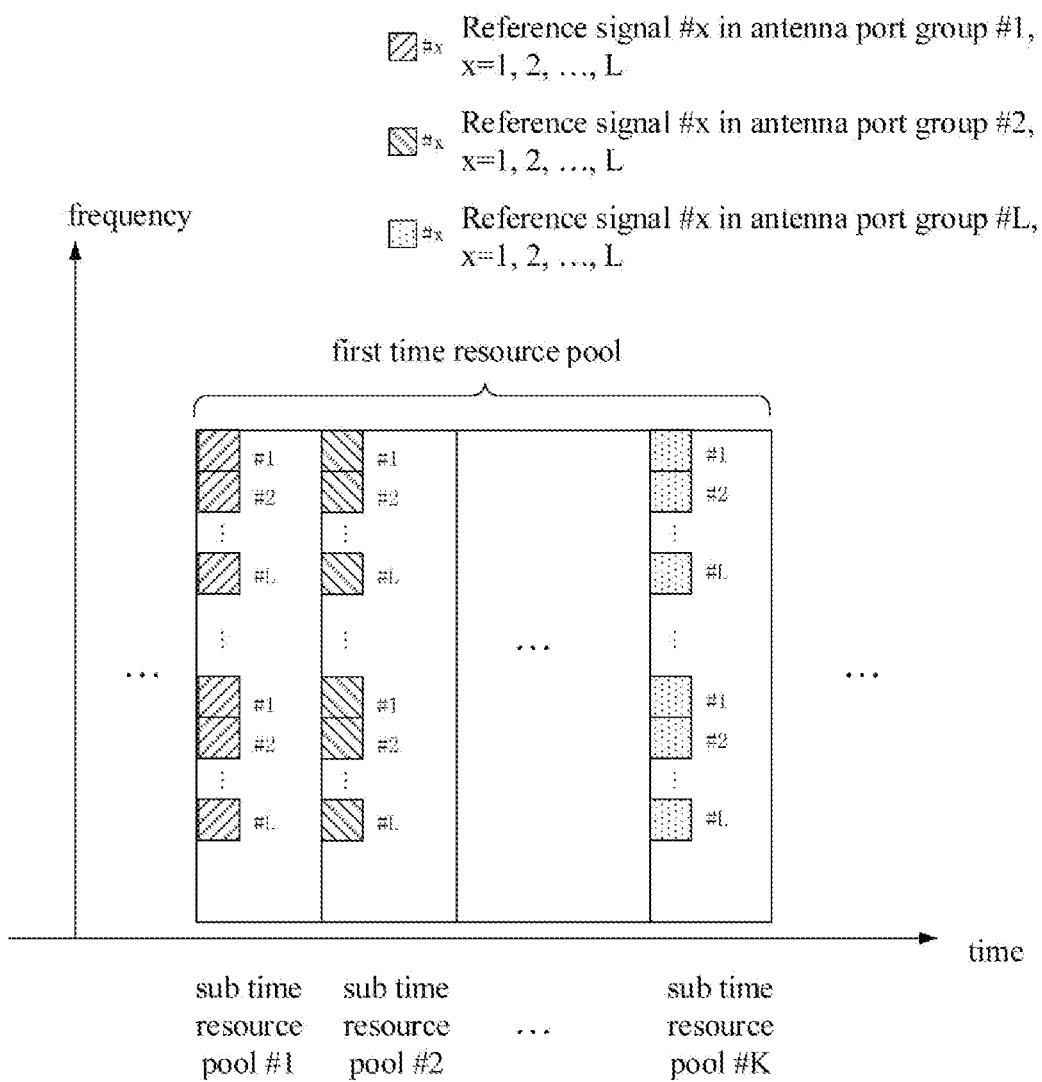
FIG. 5 illustrates a schematic diagram of resource mapping of a reference signals transmitted on K antenna port groups on time-frequency resources according to one embodiment of the present disclosure.

Embodiment 5 illustrates a schematic diagram of the resource mapping of reference signals transmitted on K antenna port groups on time-frequency resources, as shown in FIG. 5.

In Embodiment 5, the first time resource pool includes K sub-time resource pools, and the K sub-time resource pools are respectively reserved to the K antenna port groups. The reference signals transmitted on the K antenna port groups are respectively transmitted on the K sub-time resource pools. The L antenna ports included in any one of the K antenna port groups, and the L reference signals are respectively transmitted from the L antenna ports. The K and the L are respectively a positive integer. In FIG. 5, the slash filled block represents the L reference signals transmitted on the antenna port group #1; the back-slash filled block represents the L reference signals transmitted on the antenna port group #2; the dot-filled block represents the L reference signals transmitted on the antenna port group #K. The label '#x' (x=1, 2, . . . , L) next to the block indicates the x-th reference signal in the L reference signals.

In one embodiment, among all the reference signals transmitted on the K antenna port groups, time-frequency resources occupied by different reference signals are orthogonal to each other.

In one embodiment, the reference signals transmitted by any two different antenna port groups of the K antenna port groups have the identical pattern within the time-frequency resource block.

In a sub-embodiment of the foregoing embodiment, the time-frequency resource block is a PRBP (Physical Resource Block Pair).

In a sub-embodiment of the foregoing embodiment, the time-frequency resource block occupies W subcarriers in the frequency domain and occupies a wideband symbol in the time domain. The W is a positive integer greater than 1. In a sub-embodiment of this sub-embodiment, the wideband symbol is one of OFDM symbol, SC-FDMA symbol, SCMA symbol.

In one embodiment, the reference signals transmitted on the K antenna port groups are wideband.

In a sub-embodiment of the foregoing embodiment, the system bandwidth is divided into positive integer frequency domain regions, any one of the reference signals transmitted on the K antenna port groups appears in all frequency domain regions within the system bandwidth. The bandwidth corresponding to the frequency domain regions is equal to the frequency difference of the frequency unit in which the reference signal appears twice adjacent to each other.

In one embodiment, the reference signals transmitted on the K antenna port groups are narrowband.

In a sub-embodiment of the foregoing embodiment, the system bandwidth is divided into positive integer frequency domain regions, and any one of the reference signals transmitted on the K antenna port groups appears only on the partial frequency domain region.

In one embodiment, the frequency difference of any two different reference signals which the frequency unit appears twice adjacent to each other transmitted on the K antenna port group are the same.

In one embodiment, an antenna port is formed by superposing multiple antennas through antenna virtualization, and mapping coefficients of the multiple antennas to the one antenna port constitute a beamforming vector corresponding to the one antenna port.

In a sub-embodiment of the foregoing embodiment, the first antenna port is the antenna port #1 in the antenna port group #i, and the second antenna port is the antenna port #1 in the antenna port group #j, wherein the i and the j are respectively a positive integer not greater than the K, the 1 is a positive integer not greater than the L, and the i is not equal to the j. The beamforming vector corresponding to the first antenna port and the beamforming vector corresponding to the second antenna port are unequal. The reference signal transmitted by the first antenna port and the reference signal transmitted by the second antenna port have the identical pattern within the time-frequency resource block.

Embodiment 6

Figure 6:
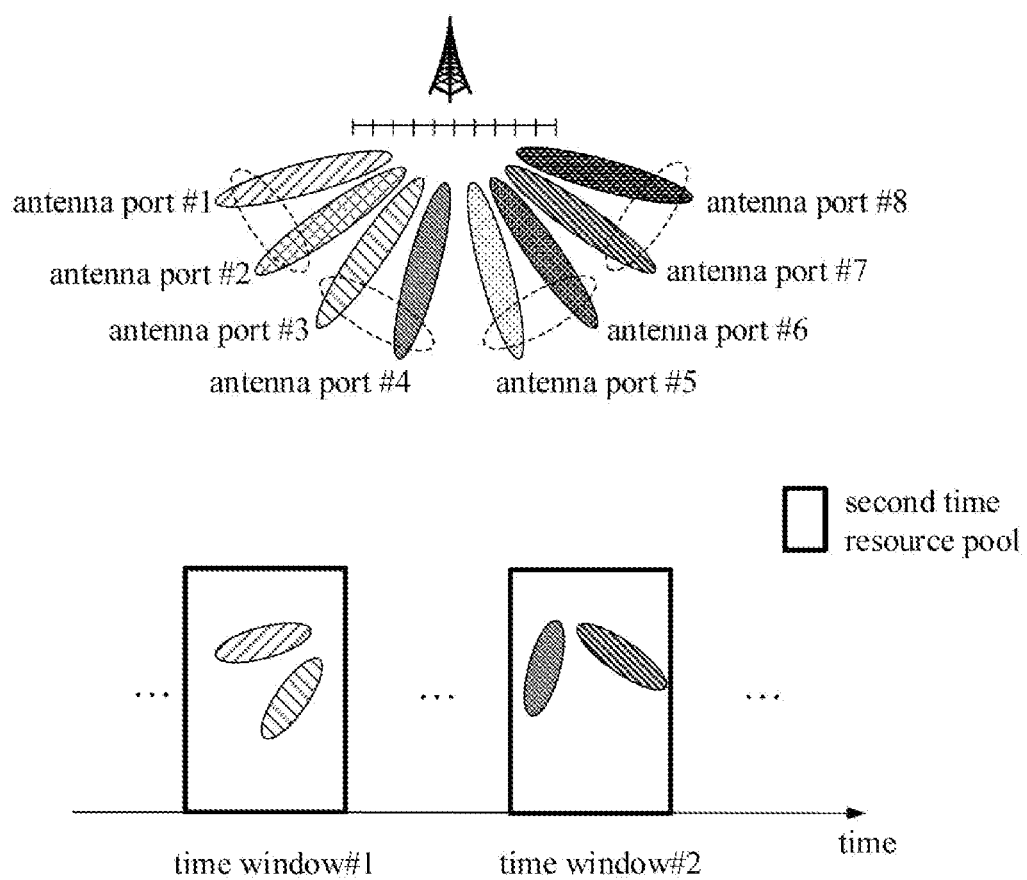
FIG. 6 illustrates a schematic diagram of the correspondence relationship between a second time resource pool and the antenna port included in the K antenna port groups according to one embodiment of the present disclosure.

Embodiment 6 illustrates a schematic diagram of a correspondence relationship between the second time resource pool and the antenna ports included in the K antenna port groups, as shown in FIG. 6.

In Embodiment 6, the second time resource pool is irrelevant from the index of the first antenna port group in the K antenna port groups in the present disclosure. The second time resource pool includes T time windows, and the T time windows are orthogonal in the time domain. The T is a positive integer greater than 1. One antenna port group includes a positive integer number of antenna port(s). Any one of the T time windows corresponds to a positive integer number of antenna port(s). The ellipse of the different filled solid borders in FIG. 6 represents different antenna ports, and the ellipse of the solid border enclosed by the ellipse of the same dashed border represents the different antenna ports belonging to the same antenna port group. The block of the thick solid border represents the second time resource pool.

In one embodiment, the first time window corresponds to M1 antenna ports, and the second time window corresponds to M2 antenna ports, wherein the first time window and the second time window are respectively any two of the T time windows. The M1 and the M2 are respectively positive integers.

In a sub-embodiment of the foregoing embodiment, at least one antenna port in the M1 antenna ports does not belong to the M2 antenna ports.

In a sub-embodiment of the foregoing embodiment, at least one antenna port in the M2 antenna ports does not belong to the M1 antenna ports.

In a sub-embodiment of the foregoing embodiment, at least two antenna ports in the M1 antenna ports belong to different antenna port groups in the K antenna port groups.

In a sub-embodiment of the foregoing embodiment, the M1 is equal to the M2.

In a sub-embodiment of the foregoing embodiment, the M1 is not equal to the M2.

In an embodiment, the T time windows are non-continuous in the time domain.

Embodiment 7

Figure 7:
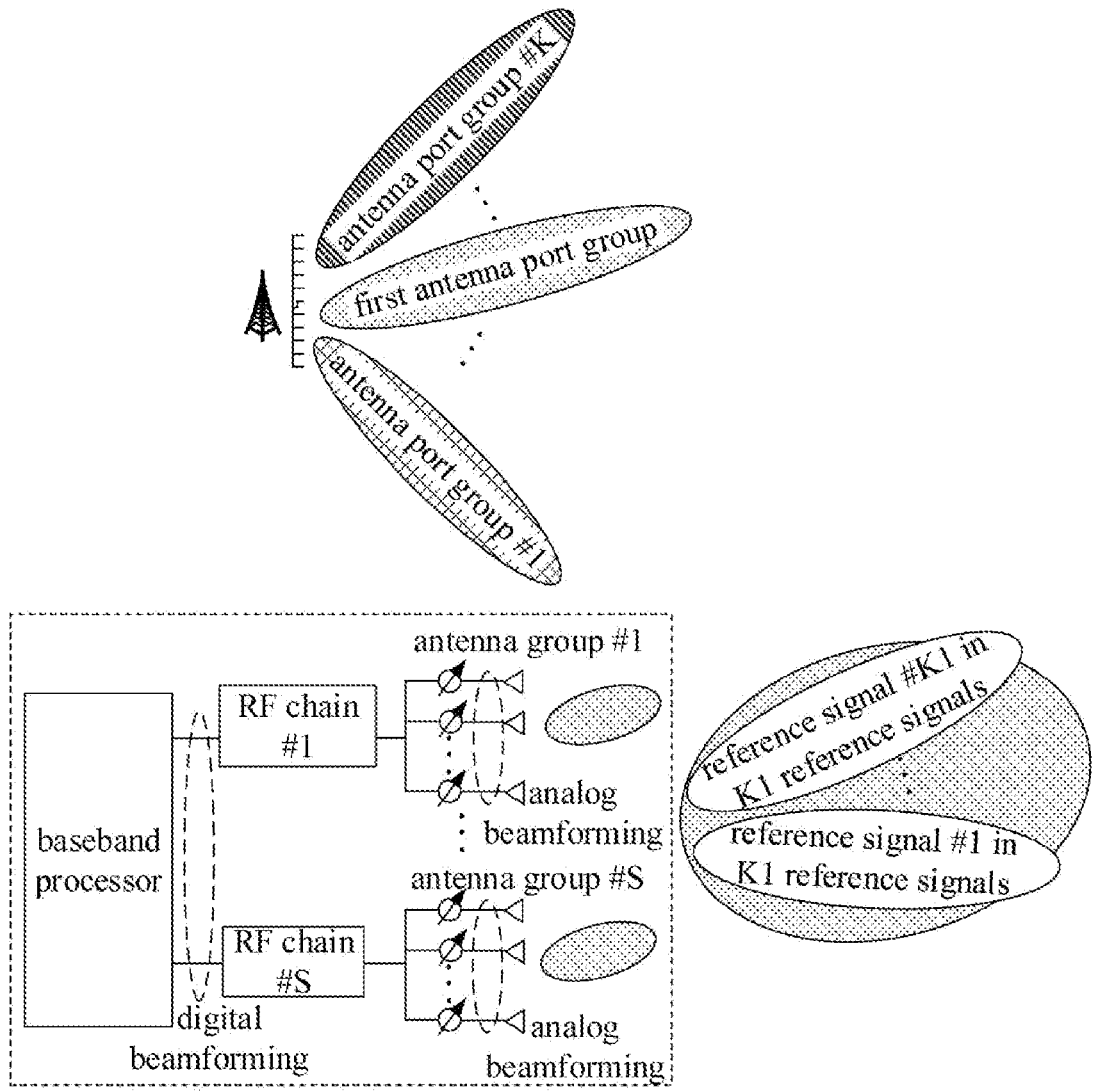
FIG. 7 illustrates a schematic diagram of a relationship between an antenna port corresponding to K1 reference signals and a first antenna port group according to one embodiment of the present disclosure.

Embodiment 7 illustrates a schematic diagram of a relationship between an antenna port corresponding to K1 reference signals and a first antenna port group, as shown in FIG. 7.

In Embodiment 7, the K1 reference signals are respectively transmitted by K1 antenna ports, the index of the first antenna port group in the K antenna port groups in the present disclosure is used by the UE in the present disclosure to determine at least one of the air interface resources occupied by the K1 reference signals, the RS sequences corresponding to the K1 reference signals.

In Embodiment 7, the antenna configured by the base station is divided into a plurality of antenna groups, and each antenna group includes a plurality of antennas. One antenna port is formed by superposing multiple antennas of one or more antenna groups through antenna virtualization, and the mapping coefficients of multiple antennas of the one or more antenna groups to the one antenna port constitute a beamforming vector corresponding to the one antenna port. A beamforming vector consists of the product of an analog beamforming matrix and a digital beamforming vector. The mapping coefficients of multiple antennas of any one given antenna group in one or more antenna groups to the one antenna port constitute an analog beamforming vector of the given antenna group. The analog beamforming vectors of different antenna groups included in the one antenna port constitutes the analog beamforming matrix of the one antenna port by diagonally arranged, and the mapping coefficients of different antenna groups included in the one antenna port to the one antenna port constitute the digital beamforming vector of the one antenna port. One antenna group is connected to the baseband processor via an RF (Radio Frequency) chain. In FIG. 7, different filled ellipses represent different one antenna port in the K antenna port groups; white ellipses represent the K1 antenna ports.

In one embodiment, the first antenna port group includes one antenna port.

In one embodiment, the number of the antenna groups included in any one of the K1 antenna ports is greater than the number of antenna groups included in any one antenna port in the first antenna port groups.

In a sub-embodiment of the foregoing embodiment, any one antenna port in the first antenna port groups includes one antenna group, and any one of the K1 antenna ports includes S antenna groups, and the S is a positive integer greater than 1. In a sub-embodiment of this sub-embodiment, the S is equal to the K1.

In one embodiment, the first antenna port is any one antenna port in the first antenna port groups, and the second antenna port is any one of the K1 antenna ports. The analog beamforming vector corresponding to any one antenna group of the second antenna port is equal to the analog beamforming vectors corresponding to any one antenna group in the first antenna port.

In one embodiment, the digital beamforming vectors corresponding to any two different antenna ports of the K1 antenna ports are unequal.

In a sub-embodiment of the foregoing embodiment, the digital beamforming vectors corresponding to any two different antenna ports of the K1 antenna ports are orthogonal to each other.

In one embodiment, the air interface resources occupied by the K1 reference signals include one or more of time domain resources, frequency domain resources, and code domain resources.

In one embodiment, the K1 reference signals are respectively CSI-RSs.

In one embodiment, the time domain resources occupied by any two of the K1 reference signals are orthogonal.

In one embodiment, any two of the K1 reference signals occupy the same time domain resources and orthogonal frequency domain resources.

In one embodiment, the RS sequences corresponding to the K1 reference signals includes a pseudo random sequence.

In one embodiment, the RS sequences corresponding to the K1 reference signals includes Zadoff-Chu sequence.

Embodiment 8

Figure 8:
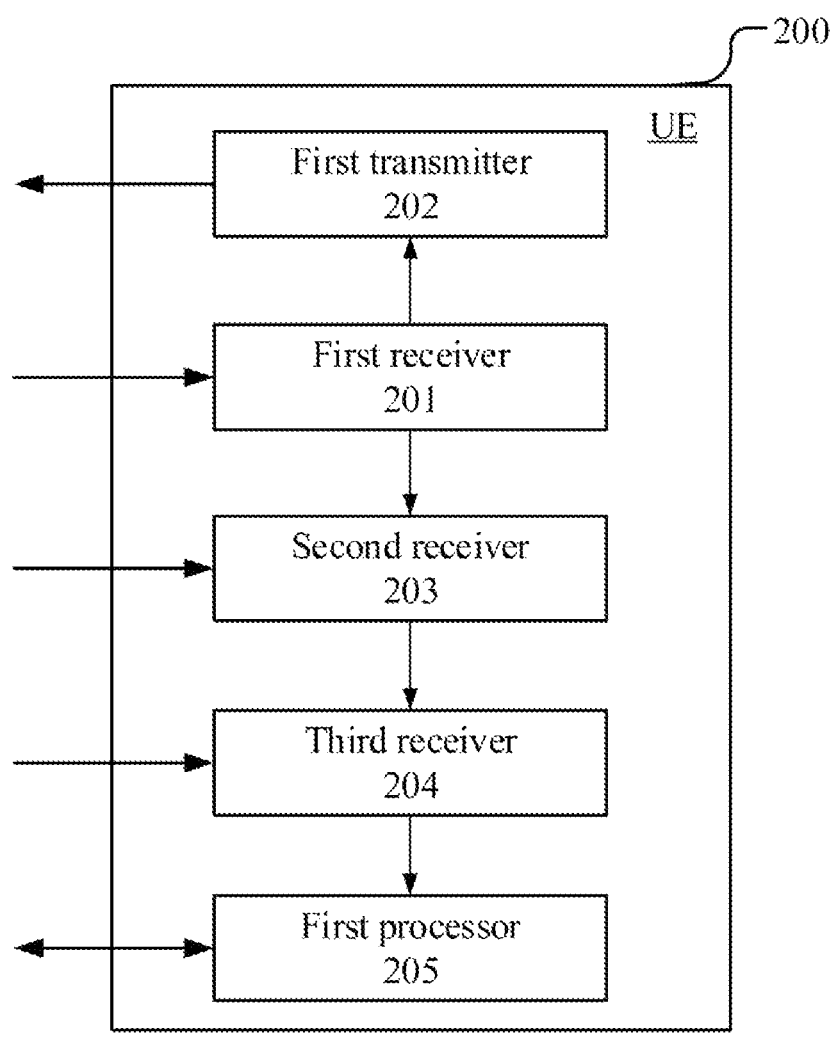
FIG. 8 illustrates a structural block diagram of a processing device for a UE according to one embodiment of the present disclosure.

Embodiment 8 illustrates a structural block diagram of a processing device in a UE, as shown in FIG. 8.

In FIG. 8, the processing device 200 in the user equipment is primarily comprised of a first receiver 201 and a first transmitter 202, a second receiver 203, a third receiver 204, and a first processor 205.

The first receiver 201 receives the first wireless signal; the first transmitter 202 transmits the second wireless signal; the second receiver 203 monitors the first signaling in the first sub-time resource pool; the third receiver 204 monitors the second signaling in the third sub-time resource pool; and the first processor 205 operates the third wireless signal.

In Embodiment 8, the first wireless signal is transmitted by K antenna port groups, and the second wireless signal is used to determine a first antenna port group. The first antenna port group is one of the K antenna port groups. The first sub-time resource pool is reserved to the first antenna port group; or an index of the first antenna port group in the K antenna port groups is used by the second receiver 203 to determine the first sub-time resource pool. One antenna port group includes a positive integer number of antenna ports, and the K is a positive integer greater than 1. The first signaling is further used by the UE in the present disclosure to determine at least one of {the third time resource pool, the number of transmitting antenna port(s) of the second signaling, and the transmitting antenna port(s) of the second signaling}. The first signaling is further used by the first processor 205 to determine a fourth time resource pool, and the time domain resources occupied by the third wireless signal belongs to the fourth time resource pool. The operating is receiving; or the operating is transmitting.

In one embodiment, the first receiver 201 further receives the first information. Wherein the first information is used by the second receiver 203 to determine the first time resource pool; the first time resource pool comprises the K sub-time resource pools. The K sub-time resource pools are respectively reserved to the K antenna port groups. The first sub-time resource pool is one of the K sub-time resource pools. Any two of the K sub-time resource pools are orthogonal on the time domain.

In one embodiment, the first receiver 201 further receives second information. The second information is used by the second receiver 203 to determine a second time resource pool. The second time resource pool and the index of the first antenna port in the K antenna port groups are irrelevant.

In one embodiment, the second receiver 203 further monitors the first signaling on the second time resource pool.

In one embodiment, the first receiver 201 further receives third information. The third information is used by the second receiver 203 to determine the first antenna port group.

In one embodiment, the third receiver 204 further receives K1 reference signals. The K1 reference signals are respectively transmitted by K1 antenna ports, and the first signaling is used by the third receiver 204 to determine at least one of {the K1, the K1 antenna ports, the air interface resources occupied by the K1 reference signals; or an index of the first antenna port group in the K antenna port groups is used by the third receiver 204 to determine at least one of the air interface resources occupied by the K1 reference signals, RS sequences corresponding to the K1 reference signals. The air interface resources occupied by the K1 reference signals include one or more of time domain resources, frequency domain resources, and code domain resources.

Embodiment 9

Figure 9:
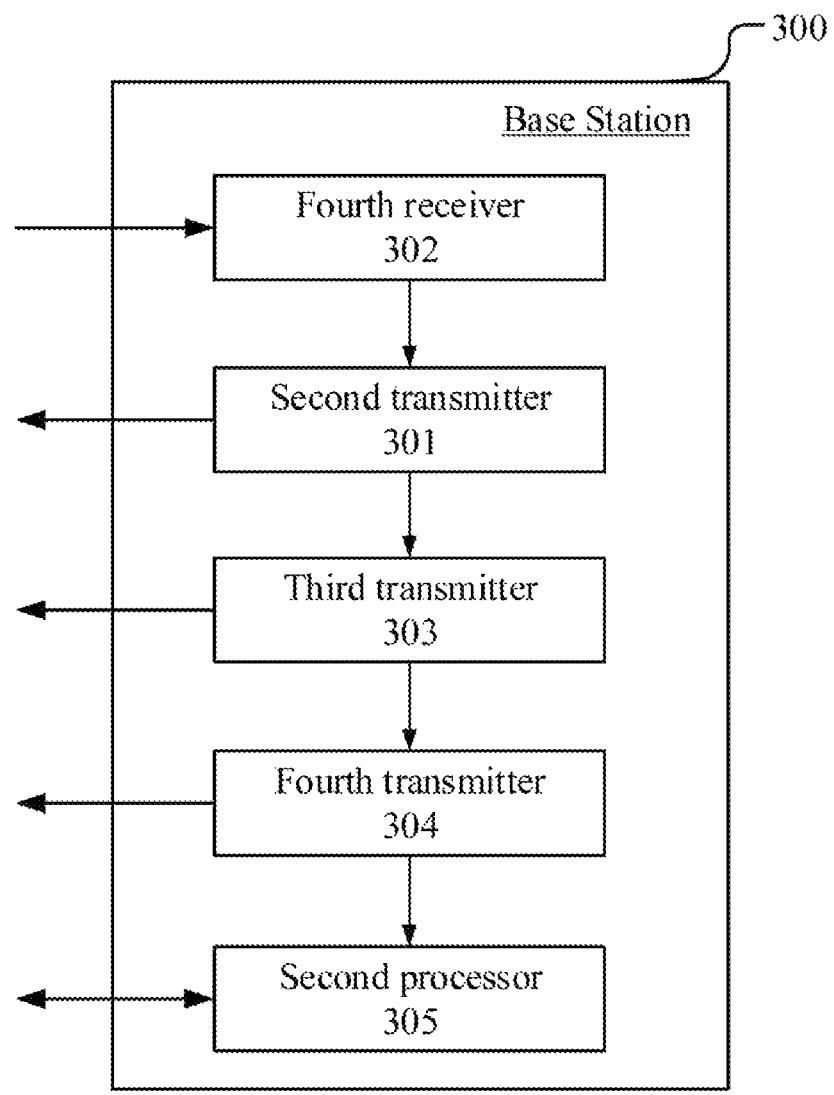
FIG. 9 illustrates a structural block diagram of a processing device for a base station according to one embodiment of the present disclosure.

Embodiment 9 illustrates a structural block diagram of a processing device in the base station equipment; as shown in FIG. 9.

In FIG. 9, the base station device 300 is primarily comprised of a second transmitter 301, a fourth receiver 302, a third transmitter 303, a fourth transmitter 304 and a second processor 305.

The second transmitter 301 transmits the first wireless signal; the fourth receiver 302 receives the second wireless signal; the third transmitter 303 transmits the first signaling in the first sub-time resource pool; the fourth transmitter 304 transmits the second signaling in the third time resource pool; the second processor 305 operates the third wireless signal.

In Embodiment 9, the first wireless signal is transmitted by K antenna port groups, and the second wireless signal is used by the third transmitter 303 to determine a first antenna port group. The first antenna port group is one of the K antenna port groups. The first sub-time resource pool is reserved to the first antenna port group; or an index of the first antenna port group in the K antenna port groups is used by the third transmitter 303 to determine the first sub-time resource pool. One antenna port group includes a positive integer number of antenna ports, and the K is a positive integer greater than 1. The first signaling is further used to determine at least one of the third time resource pool, the number of transmitting antenna port(s) of the second signaling, and the transmitting antenna port(s) of the second signaling. The first signaling is further used to determine a fourth time resource pool, and the time domain resources occupied by the third wireless signal belongs to the fourth time resource pool. The performing is a transmitting; or the performing is a receiving.

In one embodiment, the second transmitter 301 further transmits the first information. Wherein the first information is used to determine the first time the resource pool; the resource pool comprises K first sub-time resource pools. The K sub-time resource pools are reserved to the K antenna port groups. The first sub-time resource pool is one of the K sub-time resource pools. Any two of the K sub-time resource pools are orthogonal on the time domain.

In one embodiment, the second transmitter 301 further transmits the second information. The second information is used to determine a second time resource pool. The second time resource pool and the index of the first antenna port group in the K antenna port groups are irrelevant.

In one embodiment, the third transmitter 303 further transmits the first signaling on the second time resource pool.

In one embodiment, the second transmitter 301 further transmits third information. The third information is used to determine the first antenna port group.

In one embodiment, the fourth transmitter 304 further transmits K1 reference signals. The K1 reference signals are respectively transmitted by K1 antenna ports, and the first signaling is used to determine at least one of the K1, the K1 antenna ports, and the air interface resources occupied by the K1 reference signals, or the index of the first antenna port groups in the K antenna port groups is used to determine at least one of the air interface resources occupied by the K1 reference signals, the RS sequences corresponding to the K1 reference signals. The air interface resources occupied by the K1 reference signals include one or more of time domain resources, frequency domain resources, and code domain resources.

Embodiment 10

Figure 10:
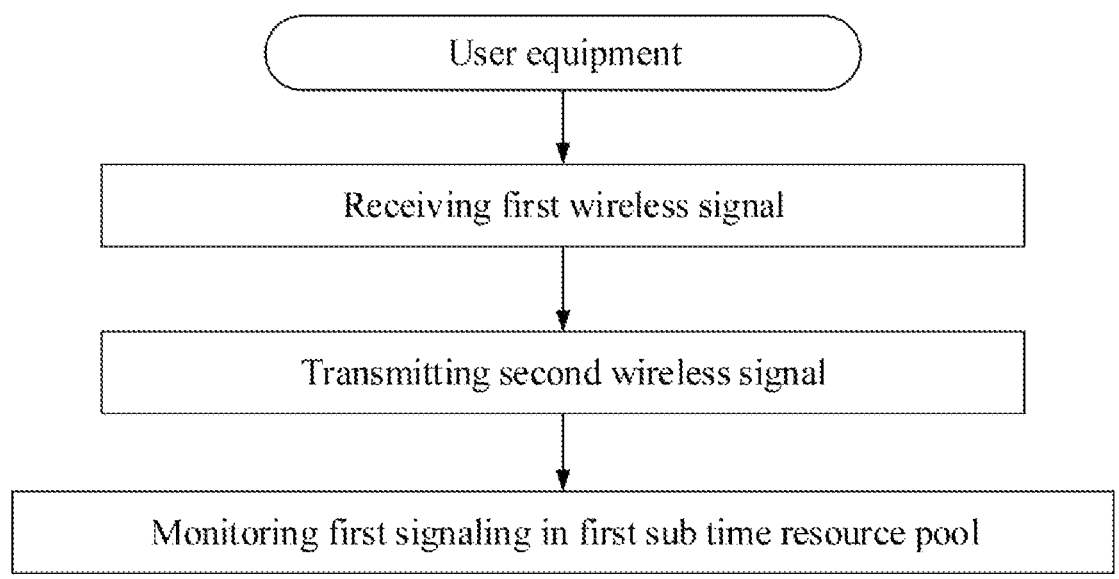
FIG. 10 illustrates flow chart of receiving a first wireless signal, transmitting a second wireless signal, and monitoring a first signaling according to one embodiment of the present disclosure.

Embodiment 10 illustrates a flow chart of receiving a first wireless signal, transmitting a second wireless signal, and monitoring a first signaling, as shown in FIG. 10.

In the embodiment 10, the UE in the present disclosure receives the first wireless signal at first; then transmits the second wireless signal; and then monitors the first signaling in the first sub-time resource pool. Wherein the first wireless signal is transmitted by K antenna port groups; the second wireless signal is used to determine a first antenna port group; the first antenna port group is one of the K antenna port groups. The first sub-time resource pool is reserved to the first antenna port group; or an index of the first antenna port group in the K antenna port group is used to determine the first sub-time resource pool. One antenna port group includes a positive integer number of antenna port(s), and the K is a positive integer greater than 1.

In one embodiment, the first signaling is transmitted by the first antenna port group.

In a sub-embodiment of the foregoing embodiment, the first antenna port group includes L antenna ports, the first signaling includes L first sub-signaling, and the L first sub-signaling carry the same bit block, the L first sub-signaling are respectively transmitted by the L antenna ports. The bit block includes a positive integer number of bit(s), and the L is a positive integer.

In one embodiment, the index of the first antenna port group in the K antenna port groups is a non-negative integer less than the K.

In one embodiment, an index of the first antenna port group in the K antenna port groups is used to generate the first signaling.

In one embodiment, a field in the first signaling indicates the index of the first antenna port group in the K antenna port groups.

In one embodiment, the UE determines the time-frequency resource occupied by the first signaling by using a blind detection method.

In one embodiment, the UE determines whether the first signaling is transmitted in the first sub-time resource pool by a blind detection method.

In a sub-embodiment of the foregoing two embodiments, the blind detection means that the UE receives a signal on multiple candidate time-frequency resources and performs a decoding operation, if the correct decoding is determined according to the check bits, the successful reception will be judged, otherwise the failure of reception will be judged.

In one embodiment, the first wireless signal includes one or more of PSS, SSS, MIB/SIB, CSI-RS.

In one embodiment, the second wireless signal is used to determine the first antenna port group from the K antenna port groups.

In one embodiment, the second wireless signal explicitly indicates the first antenna port group.

In one embodiment, the CSI-RS transmitted by one antenna port group belongs to one CSI-RS resource (CSI-RSResource), and the second wireless signal includes a CRI (CSI-RSResource Indicator), the CRI indicates the CSI-RS resource corresponding to the first antenna port group from the CSI-RS resources corresponding to the K antenna port groups.

In one embodiment, the physical layer channel corresponding to the second wireless signal includes an uplink physical layer control channel (i.e., an uplink channel that can only be used to carry physical layer signaling). In a sub-embodiment, the uplink physical layer control channel is a PUCCH.

In one embodiment, the second wireless signal implicitly indicates the first antenna port group.

In one embodiment, the second wireless signal is a RACH preamble, and at least one of the sequences of the RACH preamble and the time-frequency resource occupied by the RACH preamble is used to determine the first antenna port group.

In one embodiment, the physical layer channel corresponding to the second wireless signal includes PRACH.

In one embodiment, the first signaling is a physical layer signaling.

In one embodiment, the first signaling is non-UE-specific.

In one embodiment, the first signaling is transmitted on the downlink physical layer control channel (i.e., a downlink channel that can only be used to carry physical layer signaling).

In a sub-embodiment of the foregoing embodiment, the downlink physical layer control channel is a PDCCH.

In one embodiment, one antenna port is formed by superposing multiple antennas through antenna virtualization, and the mapping coefficients of the multiple antennas to the one antenna port constitute a beamforming vector corresponding to the one antenna port.

In a sub-embodiment of the foregoing embodiment, the beamforming vectors corresponding to any two different antenna ports cannot be assumed to be the same.

In a sub-embodiment of the foregoing embodiment, the UE cannot perform joint channel estimation utilizing reference signals transmitted by two different antenna ports.

In one embodiment, the number of antenna ports included in different antenna port groups is the same.

In one embodiment, the number of antenna ports included in at least two different antenna port groups is different.

In one embodiment, the reference signals transmitted by any two different antenna port groups of the K antenna port groups have the identical pattern within the time-frequency resource block.

In a sub-embodiment of the foregoing embodiment, the time-frequency resource block is PRBP.

In a sub-embodiment of the foregoing embodiment, the time-frequency resource block occupies W subcarriers in the frequency domain and occupies a wideband symbol in the time domain. The W is a positive integer greater than 1. In a sub-embodiment of this sub-embodiment, the wideband symbol is one of OFDM symbol, SC-FDMA symbol, SCMA symbol.

Embodiment 11

Figure 11:
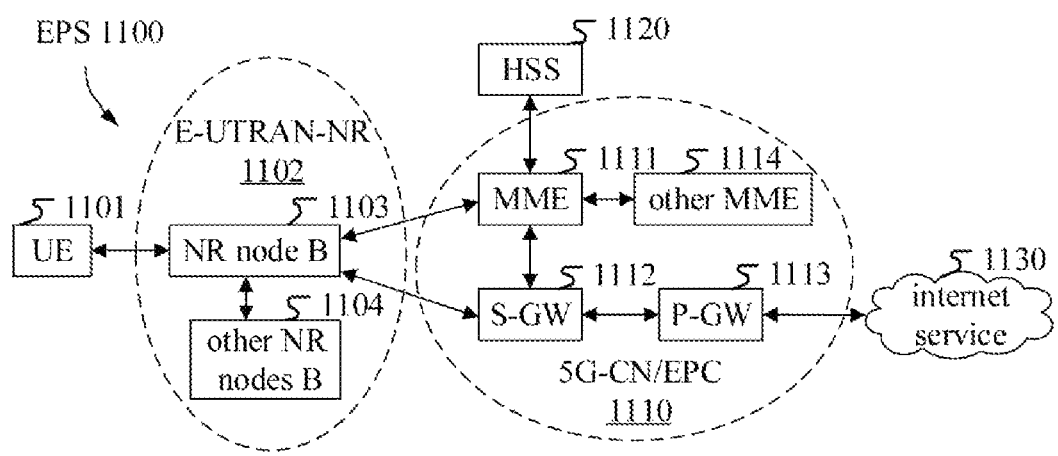
FIG. 11 illustrates a schematic diagram of a network architecture according to one embodiment of the present disclosure.

Embodiment 11 illustrates a schematic diagram of network architecture, as shown in FIG. 11.

FIG. 11 describes a network structure 1100 of LTE (long-term evolution), LTE-A (long-term evolution advanced) and future NR 5G system, the network architecture 1100 may be referred to as an EPS (evolve packet system) 1100. The EPS 1100 may include one or more UEs (user equipment) 1101, E-UTRAN-NR (evolved UMTS terrestrial radio access network-new wireless) 1102, 5G-CN (5G-corenetwork)/EPC (evolved packet core) 1110, HSS (home subscriber server) 1120 and the internet service 1130. The UMTS corresponds to the universal mobile telecommunications system. The EPS 1100 may be interconnected with other access networks, but for the sake of simplicity, these entities/interfaces are not shown. As shown in FIG. 11, the EPS 1100 provides the packet switching services. Those skilled in the art would readily appreciate that the various concepts presented throughout this disclosure can be extended to networks or other cellular networks that provide circuit switched services. The E-UTRAN-NR 1102 includes an NR Node B (gNB) 1103 and other gNBs 1104. The gNB 1103 provides user and control plane protocol termination for the UE 1101. The gNB 1103 can be connected to other gNBs 1104 via an X2 interface (e.g., a backhaul). The gNB 1103 may also be referred to as a base station, a base transceiver station, a wireless base station, a wireless transceiver, a transceiver function, a basic service set (BSS), an extended service set (ESS), a TRP (transmission and reception point), or some other suitable terminology. The gNB 1103 provides the UE 1101 with an access point to the 5G-CN/EPC 1110. In the embodiment, the UE 1101 includes cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 1101 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 1103 is connected to the 5G-CN/EPC 1110 through an S1 interface. 5G-CN/EPC 1110 includes MME 1111, other MME (Mobility Management Entity) 1114, an S-GW (Service Gateway) 1112 and a P-GW (Packet Date Network Gateway) 1113. The MME 1111 is a control node that handles signaling between the UE 1101 and the 5G-CN/EPC 1110. In general, MME 1111 provides bearer and connection management. All User IP (Internet Protocol) packets are transmitted through the S-GW 1112, and the S-GW 1112 itself is connected to the P-GW 1113. The P-GW 1113 provides UE IP address allocation as well as other functions. The P-GW 1113 is connected to the internet service 1130. The internet service 1130 includes an operator-compatible internet protocol service, and may specifically include the Internet, an intranet, an IMS (IP Multimedia Subsystem), and a PPS (packet switching service).

In one embodiment, the UE 1101 corresponds to the UE in the present disclosure.

In one embodiment, the gNB 1103 corresponds to the base station in the present disclosure.

Embodiment 12

Figure 12:
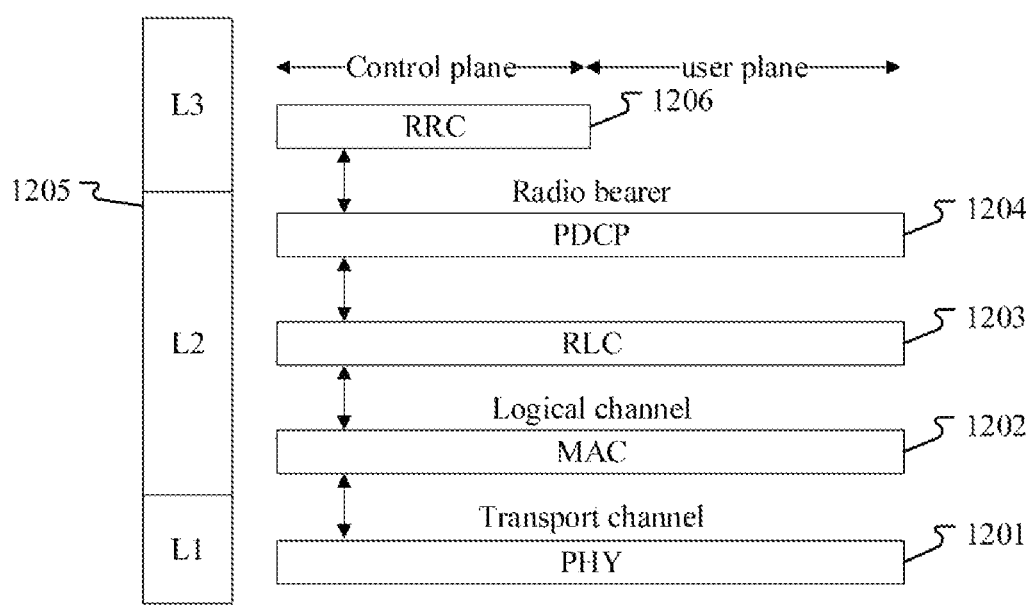
FIG. 12 illustrates a schematic diagram of a wireless protocol architecture of a user plane and a control plane according to one embodiment of the present disclosure.

Embodiment 12 illustrates a schematic diagram of wireless protocol architecture of a user plane and a control plane according to the present disclosure, as shown in FIG. 12.

FIG. 12 is a schematic diagram illustrating an embodiment of a wireless protocol architecture for a user plane and a control plane, and FIG. 12 illustrates a wireless protocol architecture for the user equipment (UE) and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 1201. Layer 2 (L2 layer) 1205 is above PHY 1201 and is responsible for the link between the UE and the gNB through PHY 1201. In the user plane, L2 layer 1205 comprises a media access control (MAC) sub-layer 1202, a radio link control (RLC) sub-layer 1203 and a packet data convergence protocol (PDCP) sub-layer 1204, and these sub-layers terminate at the gNB on the network side. Although not illustrated, the UE may have several upper layers above the L2 layer 1205, including a network layer (e.g. an IP layer) terminated at the P-GW on the network side and terminated at the other end of the connection (e.g. Application layer at the remote UE, server, etc.). The PDCP sub-layer 1204 provides multiplexing between different wireless bearers and logical channels. The PDCP sublayer 1204 also provides header compression for higher-layer data packets to reduce wireless transmission overhead, and provides the security by encrypting data packets, and provides handoff support for UEs between gNBs. The RLC sublayer 1203 provides reassembling and reassembly of higher-layer data packets, retransmission of lost packets and the reordering of data packets to compensate for the disordered reception resulted by the hybrid automatic repeat request (HARQ). The MAC sublayer 1202 provides multiplexing between the logical and transport channels. The MAC sublayer 1202 is also responsible for allocating various wireless resources (e.g. resource blocks) in one cell between UEs. The MAC sublayer 1202 is also responsible for HARQ operations. In the control plane, the wireless protocol architecture for the UE and gNB is substantially the same for the physical layer 1201 and the L2 layer 1205, but there is no header compression function for the control plane. The control plane also includes an RRC (Wireless Resource Control) sublayer 1206 in Layer 3 (L3 layer). The RRC sublayer 1206 is responsible for obtaining wireless resources (i.e. wireless bearers) and configuring the lower layer using RRC signaling between the gNB and the UE.

In one embodiment, the wireless protocol architecture of FIG. 12 is applicable to the UE in this disclosure.

In one embodiment, the wireless protocol architecture of FIG. 12 is applicable to the base station in this disclosure.

In one embodiment, the first wireless signal in the present disclosure is generated by the PHY 1201.

In one embodiment, the second wireless signal in the present disclosure is generated by the PHY 1201.

In one embodiment, the first signaling in the present disclosure is generated by the PHY 1201.

In one embodiment, the first information in the present disclosure is generated in the MAC sublayer 1202.

In one embodiment, the first information in the present disclosure is generated in the RRC sublayer 1206.

In one embodiment, the second information in the present disclosure is generated in the MAC sublayer 1202.

In one embodiment, the second information in the present disclosure is generated in the RRC sublayer 1206.

In one embodiment, the first signaling in the present disclosure is generated by the PHY 1201.

In one embodiment, the K1 reference signals in the present disclosure are generated by the PHY 1201.

In one embodiment, the third wireless signal in the present disclosure is generated by the PHY 1201.

In one embodiment, the third information in the present disclosure is generated by the PHY 1201.

In one embodiment, the third information in the present disclosure is generated in the MAC sublayer 1202.

In one embodiment, the third information in the present disclosure is generated in the RRC sublayer 1206.

Embodiment 13

Figure 13:
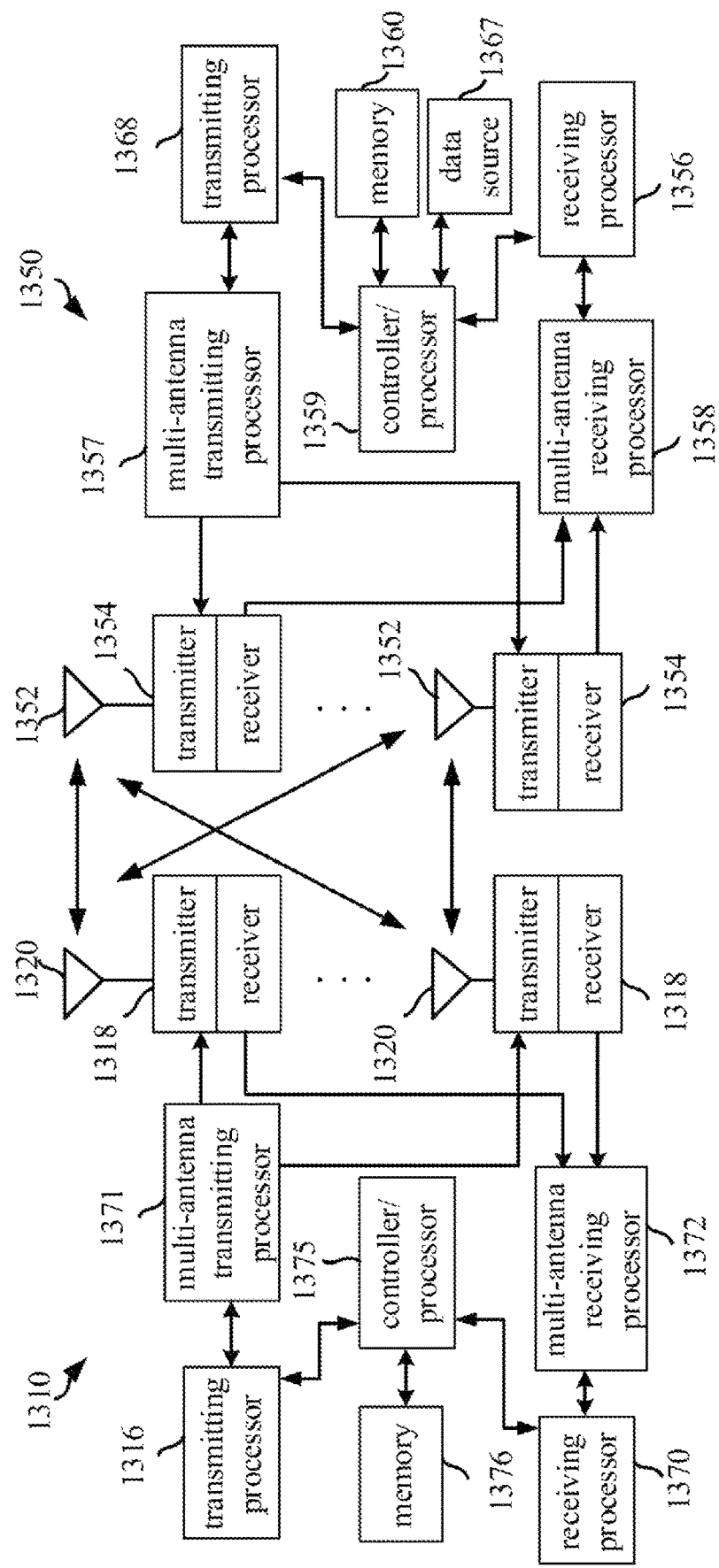
FIG. 13 illustrates a schematic diagram of a New Radio (NR) node and a UE according to one embodiment of the present disclosure.

Embodiment 13 illustrates a schematic diagram of an NR (New Radio) node and a UE, as shown in FIG. 13. In FIG. 13 is a block diagram of a gNB 1310 in communication with a UE 1350 in an access network.

The gNB 1310 includes a controller/processor 1375, a memory 1376, a receiving processor 1370, a transmitting processor 1316, a multi-antenna receiving processor 1372, a multi-antenna transmitting processor 1371, a transmitter/receiver 1318, and an antenna 1320.

The user equipment 1350 includes a controller/processor 1359, a memory 1360, a data source 1367, a transmitting processor 1368, a receiving processor 1356, a multi-antenna transmitting processor 1357, a multi-antenna receiving processor 1358, a transmitter/receiver 1354, and an antenna 1352.

In DL (Downlink), at gNB 1310, a higher-layer data packet from the core network is provided to controller/processor 1375. The controller/processor 1375 implements functions of the L2 layer. In the DL, the controller/processor 1375 provides header compression, encryption, packet reassembling and reordering, multiplexing between logical and transport channels, and radio resource allocation for the UE 1350 based on various priorities. The controller/processor 1375 is also responsible for HARQ operation, retransmission of a lost packet, and a signaling to the UE 1350. The transmitting processor 1316 and multi-antenna transmitting processor 1371 implement various signal processing functions for the L1 layer (i.e., the physical layer). The transmitting processor 1316 performs encoding and interleaving to facilitate forward error correction (FEC) at UE 1350, mapping of signal clusters based on various modulation schemes (e.g., binary phase shift keying (BPSK), quadrature phase shift keying (QPSK), M-phase shift keying (M-PSK), M quadrature amplitude modulation (M-QAM)). The multi-antenna transmitting processor 1371 performs digital spatial precoding of coded and modulated symbols, comprising codebook based precoding and non-codebook based precoding, beamforming processing, and generating one or more spatial streams. The transmitting processor 1316 then maps each spatial stream to sub-carriers, and the spatial streams multiplex with reference signals (e.g., pilots) in the time and/or frequency domain, and then uses an inverse fast Fourier transform (IFFT) to generate a physical channel carrying a time-domain multi-carrier symbol stream. The multi-antenna transmitting processor 1371 then transmits an analog precoding/beamforming operation to the time domain multi-carrier symbol stream. Each transmitter 1318 converts the baseband multicarrier symbol stream provided by the multi-antenna transmitting processor 1371 into a radio frequency stream, which is then provided to a different antenna 1320.

In DL (Downlink), at UE 1350, each receiver 1354 receives a signal through its corresponding antenna 1352. Each receiver 1354 recovers the information modulated onto the radio frequency carrier and converts the radio frequency stream into a baseband multi-carrier symbol stream for providing to the receiving processor 1356. The receiving processor 1356 and multi-antenna receiving processor 1358 implement various signal processing functions at the L1 layer. The multi-antenna receiving processor 1358 performs a receiving analog precoding/beamforming operation of the baseband multi-carrier symbol stream from receiver 1354. The receiver processor 1356 converts the received analog precoded/beamforming operated baseband multicarrier symbol stream from time domain to frequency domain using Fast Fourier transform (FFT). In the frequency domain, the physical layer data signal and the reference signal are demultiplexed by the receiving processor 1356, wherein the reference signal will be used for channel estimation, and the data signal is recovered by the multi-antenna detection in the multi-antenna receiving processor 1358 to any spatial stream for the UE 1350 destinations. The symbols on each spatial stream are demodulated and recovered in the receiving processor 1356 and generated soft decision. The receiving processor 1356 then decodes and deinterleaves the soft decision to recover the upper layer data and control signals transmitted by the gNB 1310 on the physical channel. The upper layer data and control signals are then provided to the controller/processor 1359. The controller/processor 1359 implements the functions of the L2 layer. The controller/processor 1359 can be associated with memory 1360 that stores program codes and data. The memory 1360 can be referred to as a computer readable medium. In the DL, the controller/processor 1359 provides demultiplexing, packet reassembly, decryption, header decompression, and control signal processing between the transport and logical channels to recover upper layer packets that came from the core network. The upper layer packet is then provided to all protocol layers above the L2 layer. Various control signals can also be provided to L3 for L3 processing. The controller/processor 1359 is also responsible for error detection using an acknowledgement (ACK) and/or negative acknowledgement (NACK) protocol to support HARQ operations.

In UL (Uplink), at UE 1350, data source 1367 is used to provide higher-layer data packets to the controller/processor 1359. The data source 1367 represents all protocol layers above the L2 layer. Similar to the transmitting function at gNB 1310 described in the DL, the controller/processor 1359 implements header compression, encryption, packet reassembling and reordering, and multiplexing between the logical and transport channels based on the wireless resource allocation of the gNB 1310, to implement L2 layer functions for the user plane and control plane. The controller/processor 1359 is also responsible for HARQ operations, retransmission of a lost packet, and a signaling to the gNB 1310. The transmitting processor 1368 performs modulation mapping, channel coding processing, and the multi-antenna transmitting processor 1357 performs digital multi-antenna spatial precoding, including codebook based precoding and non-codebook based precoding, and beamforming processing, followed by transmitting processor 1368 modulates the generated spatial stream into a multi-carrier/single-carrier symbol stream, which is provided to different antennas 1352 via transmitter 1354 after an analog pre-coding/beamforming operation in multi-antenna transmitting processor 1357. Each transmitter 1354 first converts the baseband symbol stream provided by the multi-antenna transmit processor 1357 into a stream of radio frequency symbols and provides it to the antenna 1352.

In UL (Uplink), the function at gNB 1310 is similar to the receiving function at UE 1350 described in the DL. Each receiver 1318 receives a radio frequency signal through its respective antenna 1320, converts the received radio frequency signal into a baseband signal, and provides the baseband signal to the multi-antenna receiving processor 1372 and the receiving processor 1370. The receiving processor 1370 and the multi-antenna receiving processor 1372 collectively implement the functions of the L1 layer. The controller/processor 1375 implements the L2 layer function. The controller/processor 1375 can be interconnected with the memory 1376 that stores program codes and data. The memory 1376 can be referred to as a computer readable medium. In the UL, the controller/processor 1375 provides demultiplexing, packet reassembly, decryption, header decompression, control signal processing between the transport and logical channels to recover higher-layer data packets that came from the UE 1350. The upper layer data packets from the controller/processor 1375 can be provided to the core network. The controller/processor 1375 is also responsible for error detection using ACK and/or NACK protocols to support HARQ operations.

In one embodiment, the UE 1350 includes: at least one processor and at least one memory, the at least one memory including computer program codes; the at least one memory and the computer program code are configured to operate with at least one processor together.

In one sub-embodiment, the UE 1350 includes a memory storing a computer readable instruction program, which generates an action when executed by the at least one processor, and the action comprises: receiving the first wireless signal, transmitting the second wireless signal in the present disclosure, monitoring the first signaling in this disclosure, receiving the first information in this disclosure, receiving the second information in this disclosure, receiving the second signaling in this disclosure, receiving the K1 reference signals in this disclosure, receiving the third wireless signal in this disclosure, and transmitting the third wireless signal in this disclosure, receiving the third information in this disclosure.

In one sub-embodiment, the gNB 1310 device includes: at least one processor and at least one memory, the at least one memory includes computer program codes; the at least one memory and the computer program code are configured to be operated with at least one processor together.

In one embodiment, the gNB 1310 includes: a memory storing a computer readable instruction program that, when executed by at least one processor, generates an action, the action comprising: transmitting the first wireless signal in the present disclosure, receiving a second wireless signal in this disclosure, transmitting the first signaling in this disclosure, transmitting the first information in this disclosure, transmitting the second information in this disclosure, transmitting the second signaling in this disclosure, transmitting the K1 reference signals in this disclosure, transmitting the third wireless signal in this disclosure, receiving the third wireless signal in this disclosure, transmitting the third information in this disclosure.

In one embodiment, the UE 1350 corresponds to the UE in this disclosure.

In one embodiment, the gNB 1310 corresponds to the base station in this disclosure.

In one embodiment, at least one of the antenna 1352, the receiver 1354, the receiving processor 1356, the multi-antenna receiving processor 1358, the controller/processor 1359 is used to receive the first wireless signal; at least one of the antenna 1320, the transmitter 1318, the transmitting processor 1316, the multi-antenna transmitting processor 1371, the controller/processor 1375 is used to transmit the first wireless signal.

In one embodiment, at least one of the antenna 1320, the receiver 1318, the receiving processor 1370, the multi-antenna receiving processor 1372, the controller/processor 1375 is used to receive the second wireless signal; at least one of the antenna 1352, the transmitter 1354, the transmitting processor 1368, the multi-antenna transmitting processor 1357, the controller/processor 1359 is used to transmit the second wireless signal.

In one embodiment, at least one of the antenna 1352, the receiver 1354, the receiving processor 1356, the multi-antenna receiving processor 1358, the controller/processor 1359 is used to monitor the first signaling; at least one of the antenna 1320, the transmitter 1318, the transmitting processor 1316, the multi-antenna transmitting processor 1371, the controller/processor 1375 is used to transmit the first signaling.

In one embodiment, at least one of the antenna 1352, the receiver 1354, the receiving processor 1356, the multi-antenna receiving processor 1358, the controller/processor 1359 is used to receive the first information; at least one of the antenna 1320, the transmitter 1318, the transmitting processor 1316, the multi-antenna transmitting processor 1371, the controller/processor 1375 is used to transmit the first information.

In one embodiment, at least one of the antenna 1352, the receiver 1354, the receiving processor 1356, the multi-antenna receiving processor 1358, the controller/processor 1359 is used to receive the second information; at least one of the antenna 1320, the transmitter 1318, the transmitting processor 1316, the multi-antenna transmitting processor 1371, the controller/processor 1375 is used to transmit the second information.

In one embodiment, at least one of the antenna 1352, the receiver 1354, the receiving processor 1356, the multi-antenna receiving processor 1358, the controller/processor 1359 is used to monitor the second signaling; at least one of the antenna 1320, the transmitter 1318, the transmitting processor 1316, the multi-antenna transmitting processor 1371, the controller/processor 1375 is used to transmit the second signaling.

In one embodiment, at least one of the antenna 1352, the receiver 1354, the receiving processor 1356, the multi-antenna receiving processor 1358, the controller/processor 1359 is used to receive the K1 reference signals; at least one of the antenna 1320, the transmitter 1318, the transmitting processor 1316, the multi-antenna transmitting processor 1371, the controller/processor 1375 is used to transmit the K1 reference signals.

In one embodiment, at least one of the antenna 1352, the receiver 1354, the receiving processor 1356, the multi-antenna receiving processor 1358, the controller/processor 1359 is used to receive the third wireless signal; at least one of the antenna 1320, the transmitter 1318, the transmitting processor 1316, the multi-antenna transmitting processor 1371, the controller/processor 1375 is used to transmit the third wireless signal.

In one embodiment, at least one of the antenna 1320, the receiver 1318, the receiving processor 1370, the multi-antenna receiving processor 1372, the controller/processor 1375 is used to receive the third wireless signal; at least one of the antenna 1352, the transmitter 1354, the transmitting processor 1368, the multi-antenna transmitting processor 1357, the controller/processor 1359 is used to transmit the third wireless signal.

In one embodiment, at least one of the antenna 1352, the receiver 1354, the receiving processor 1356, the multi-antenna receiving processor 1358, the controller/processor 1359 is used to receive the third information; at least one of the antenna 1320, the transmitter 1318, the transmitting processor 1316, the multi-antenna transmitting processor 1371, the controller/processor 1375 is used to transmit the third information.

In one embodiment, the first receiver 201 includes at least one of the antenna 1352, the receiver 1354, the receiving processor 1356, the multi-antenna receiving processor 1358, the controller/processor 1359, the memory 1360, the data sources 1367 in Embodiment 8.

In one embodiment, the first transmitter 202 includes at least one of the antenna 1352, the transmitter 1354, the transmitting processor 1368, the multi-antenna transmitting processor 1357, the controller/processor 1359, the memory 1360, the data sources 1367 in Embodiment 8.

In one embodiment, the second receiver 203 includes at least one of the antenna 1352, the receiver 1354, the receiving processor 1356, the multi-antenna receiving processor 1358, the controller/processor 1359, the memory 1360, the data sources 1367 in Embodiment 8.

In one embodiment, the third receiver 204 includes at least one of the antenna 1352, the receiver 1354, the receiving processor 1356, the multi-antenna receiving processor 1358, the controller/processor 1359, the memory 1360, the data sources 1367 in Embodiment 8.

In one embodiment, the first processor 205 includes at least one of the antenna 1352, the receiver 1354, the receiving processor 1356, the multi-antenna receiving processor 1358, the controller/processor 1359, the memory 1360, the data sources 1367 in Embodiment 8.

In one embodiment, the first processor 205 includes at least one of the antenna 1352, the transmitter 1354, the transmitting processor 1368, the multi-antenna transmitting processor 1357, the controller/processor 1359, the memory 1360, the data sources 1367 in Embodiment 8.

In one embodiment, the second transmitter 301 includes at least one of the antenna 1320, the transmitter 1318, the transmitting processor 1316, the multi-antenna transmitting processor 1371, the controller/processor 1375, the memory 1376 in Embodiment 9.

In one embodiment, the fourth receiver 302 includes at least one of the antenna 1320, the receiver 1318, the receiving processor 1370, the multi-antenna receiving processor 1372, the controller/processor 1375, the memory 1376 in Embodiment 9.

In one embodiment, the third transmitter 303 includes at least one of the antenna 1320, the transmitter 1318, the transmitting processor 1316, the multi-antenna transmitting processor 1371, the controller/processor 1375, the memory 1376 in Embodiment 9.

In one embodiment, the fourth transmitter 304 includes at least one of the antenna 1320, the transmitter 1318, the transmitting processor 1316, the multi-antenna transmitting processor 1371, the controller/processor 1375, the memory 1376 in Embodiment 9.

In one embodiment, the second processor 305 includes at least one of the antenna 1320, the transmitter 1318, the transmitting processor 1316, the multi-antenna transmitting processor 1371, the controller/processor 1375, the memory 1376 in Embodiment 9.

In one embodiment, the second processor 305 includes at least one of the antenna 1320, the receiver 1318, the receiving processor 1370, the multi-antenna receiving processor 1372, the controller/processor 1375, the memory 1376 in Embodiment 9.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things IOT, RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for multi-antenna transmission in a user equipment, comprising:
    receiving a first wireless signal;
    transmitting a second wireless signal;
    monitoring a first signaling in a first sub-time resource pool;
    receiving second information; and
    monitoring the first signaling in a second time resource pool;
    wherein the first wireless signal is transmitted by K antenna port groups; the second wireless signal is used to determine a first antenna port group; the first antenna port group is one of the K antenna port groups; an index of the first antenna port group in the K antenna port groups is used to determine the first sub-time resource pool; the first sub-time resource pool is non-contiguous in time domain; one antenna port group in the K antenna port groups includes a positive integer number of antenna port/ports; the K is a positive integer greater than 1; the first wireless signal includes one or more of PSS (Primary Synchronization Signal), SSS (Secondary Synchronization Signal), and MIB (Master Information Block)/SIB (System Information Block); the second wireless signal is a RACH (Random Access Channel) preamble, and at least one of a sequence of the RACH preamble and a time-frequency resource occupied by the RACH preamble is used to determine the first antenna port group; the first signaling is non-UE-specific and the first signaling is transmitted on PDCCH (Physical Downlink Control Channel); the second information is used to determine the second time resource pool, the second time resource pool is unrelated to the index of the first antenna port group in the K antenna port groups, and the second time resource pool is non-contiguous in time domain.

2. The method of claim 1, further comprising:
    receiving first information, wherein the first information is used to determine a first time resource pool, the first time resource pool comprises K sub-time resource pools, the K sub-time resource pools are respectively reserved to the K antenna port groups, the first sub-time resource pool is one of the K sub-time resource pools, any two sub-time resource pools of the K sub-time resource pools are orthogonal in the time domain; any one of the K sub-time resource pools is non-contiguous in time domain.

3. The method of claim 2, wherein the first information includes one or more RRC (Radio Resource Control) IE (Information Element);
    or, the first information is transmitted on a PBCH (Physical Broadcast CHannel);
    or, the first signaling is respectively transmitted once in the K sub-time resource pools.

4. The method of claim 1, wherein the index of the first antenna port group in the K antenna port groups is used to generate the first signaling.

5. The method of claim 1, further comprising:
    receiving a third wireless signal;
    wherein the first signaling is used to determine a fourth time resource pool; time domain resources occupied by the third wireless signal belong to the fourth time resource pool; a physical layer channel corresponding to the third wireless signal includes a PDSCH;
    or receiving K1 reference signal/signals;
    wherein the K1 reference signal/signals is/are respectively transmitted by K1 antenna port/ports; the index of the first antenna port group in the K antenna port groups is used to determine at least one of the air interface resource/resources occupied by the K1 reference signal/signals and reference signal (RS) sequence/sequences corresponding to the K1 reference signal/signals; the air interface resource/resources occupied by the K1 reference signal/signals includes/include one or more of time domain resources, frequency domain resources, and code domain resources.

6. A method for multi-antenna transmitting in a base station, comprising:
    transmitting a first wireless signal;
    receiving a second wireless signal;
    transmitting a first signaling in a first sub-time resource pool;
    transmitting second information; and
    transmitting the first signaling in a second time resource pool;
    wherein the first wireless signal is transmitted by K antenna port groups; the second wireless signal is used to determine a first antenna port group; the first antenna port group is one of the K antenna port groups; an index of the first antenna port group in the K antenna port groups is used to determine the first sub-time resource pool; the first sub-time resource pool is non-contiguous in time domain; one antenna port group in the K antenna port groups includes a positive integer number of antenna port/ports; and the K is a positive integer greater than 1; the first wireless signal includes one or more of PSS (Primary Synchronization Signal), SSS (Secondary Synchronization Signal), and MIB (Master Information Block)/SIB (System Information Block); the second wireless signal is a RACH (Random Access Channel) preamble, and at least one of a sequence of the RACH preamble and a time-frequency resource occupied by the RACH preamble is used to determine the first antenna port group; the first signaling is non-UE-specific and the first signaling is transmitted on PDCCH (Physical Downlink Control Channel); the second information is used to determine the second time resource pool, the second time resource pool is unrelated to the index of the first antenna port group in the K antenna port groups, and the second time resource pool is non-contiguous in time domain.

7. The method of claim 6, further comprising:
    transmitting first information, wherein the first information is used to determine a first time resource pool, the first time resource pool comprises K sub-time resource pools, and the K sub-time resource pools are respectively reserved to the K antenna port groups, the first sub-time resource pool is one of the K sub-time resource pools, and any two sub-time resource pools of the K sub-time resource pools are orthogonal in the time domain; any one of the K sub-time resource pools is non-contiguous in time domain.

8. The method of claim 7, wherein the first information includes one or more RRC (Radio Resource Control) IE (Information Element);
    or, the first information is transmitted on a PBCH (Physical Broadcast CHannel);
    or, the first signaling is respectively transmitted once in the K sub-time resource pools.

9. The method of claim 6, wherein the index of the first antenna port group in the K antenna port groups is used to generate the first signaling.

10. The method of claim 6, further comprising:
transmitting a third wireless signal;
wherein the first signaling is used to determine a fourth time resource pool; time domain resources occupied by the third wireless signal belong to the fourth time resource pool; a physical layer channel corresponding to the third wireless signal includes a PDSCH;
or, transmitting K1 reference signal/signals;
wherein the K1 reference signal/signals is/are respectively transmitted by K1 antenna port/ports; the index of the first antenna port group in the K antenna port groups is used to determine at least one of the air interface resource/resources occupied by the K1 reference signal/signals and reference signal (RS) sequence/sequences corresponding to the K1 reference signal/signals; the air interface resource/resources occupied by the K1 reference signal/signals includes/include one or more of time domain resources, frequency domain resources, and code domain resources.

11. A user equipment (UE) for multi-antenna transmission, comprising: a first receiver, receiving a first wireless signal and a second information;
a first transmitter, transmitting a second wireless signal; and
a second receiver, monitoring a first signaling in a first sub-time resource pool, and monitoring the first signaling in a second time resource pool;
wherein the first wireless signal is transmitted by K antenna port groups; the second wireless signal is used to determine a first antenna port group; the first antenna port group is one of the K antenna port groups; an index of the first antenna port group in the K antenna port groups is used to determine the first sub-time resource pool; the first sub-time resource pool is non-contiguous in time domain; one antenna port group in the K antenna port groups includes a positive integer number of antenna port/ports; the K is a positive integer greater than 1; the first wireless signal includes one or more of PSS (Primary Synchronization Signal), SSS(Secondary Synchronization Signal), and MIB (Master Information Block)/SIB (System Information Block); the second wireless signal is a RACH (Random Access Channel) preamble, and at least one of a sequence of the RACH preamble and a time-frequency resource occupied by the RACH preamble is used to determine the first antenna port group; the first signaling is non-UE-specific and the first signaling is transmitted on PDCCH (Physical Downlink Control Channel); the second information is used to determine the second time resource pool, the second time resource pool is unrelated to the index of the first antenna port group in the K antenna port groups, and the second time resource pool is non-contiguous in time domain.

12. The UE of claim 11, wherein the first receiver receives first information, wherein the first information is used to determine a first time resource pool, the first time resource pool comprises K sub-time resource pools, and the K sub-time resource pools are respectively reserved to the K antenna port groups, the first sub-time resource pool is one of the K sub-time resource pools, and any two sub-time resource pools of the K sub-time resource pools are orthogonal in the time domain; any one of the K sub-time resource pools is non-contiguous in time domain.

13. The UE of claim 12, wherein the first information includes one or more RRC (Radio Resource Control) IE (Information Element);
or, the first information is transmitted on a PBCH (Physical Broadcast CHannel);
or, the first signaling is respectively transmitted once in the K sub-time resource pools.

14. The UE of claim 11, wherein the index of the first antenna port group in the K antenna port groups is used to generate the first signaling.

15. The UE of claim 11, further comprising:
a first processor, receiving a third wireless signal;
wherein the first signaling is used to determine a fourth time resource pool; time domain resources occupied by the third wireless signal belong to the fourth time resource pool; a physical layer channel corresponding to the third wireless signal includes a PDSCH;
or a third receiver, receiving K1 reference signal/signals;
wherein the K1 reference signal/signals is/are respectively transmitted by K1 antenna port/ports; the index of the first antenna port group in the K antenna port groups is used to determine at least one of the air interface resource/resources occupied by the K1 reference signal/signals and reference signal (RS) sequence/sequences corresponding to the K1 reference signal/signals; the air interface resource/resources occupied by the K1 reference signal/signals includes/include one or more of time domain resources, frequency domain resources, and code domain resources.

16. A base station equipment for multi-antenna transmission, comprising:
a second transmitter, transmitting a first wireless signal and second information;
a fourth receiver, receiving a second wireless signal; and
a third transmitter, transmitting a first signaling in a first sub-time resource pool and transmitting the first signaling in a second time resource pool;
wherein the first wireless signal is transmitted by K antenna port groups; the second wireless signal is used to determine a first antenna port group; the first antenna port group is one of the K antenna port groups; an index of the first antenna port group in the K antenna port groups is used to determine the first sub-time resource pool; the first sub-time resource pool is non-contiguous in time domain; one antenna port group in the K antenna port groups includes a positive integer number of antenna port/ports; and the K is a positive integer greater than 1; the first wireless signal includes one or more of PSS (Primary Synchronization Signal), SSS (Secondary Synchronization Signal), and MIB (Master Information Block)/SIB (System Information Block); the second wireless signal is a RACH (Random Access Channel) preamble, and at least one of a sequence of the RACH preamble and a time-frequency resource occupied by the RACH preamble is used to determine the first antenna port group; the first signaling is non-UE-specific and the first signaling is transmitted on PDCCH (Physical Downlink Control Channel); the second information is used to determine the second time resource pool, the second time resource pool is unrelated to the index of the first antenna port group in the K antenna port groups, and the second time resource pool is non-contiguous in time domain.

17. The base station equipment of claim 16, wherein the second transmitter transmits first information, wherein the first information is used to determine a first time resource pool, the first time resource pool comprises K sub-time resource pools, and the K sub-time resource pools are respectively reserved to the K antenna port groups, the first sub-time resource pool is one of the K sub-time resource pools, and any two sub-time resource pools of the K sub-time resource pools are orthogonal in the time domain; any one of the K sub-time resource pools is non-contiguous in time domain.

18. The base station equipment of claim 17, wherein the first information includes one or more RRC (Radio Resource Control) IE (Information Element);
   or, the first information is transmitted on a PBCH (Physical Broadcast CHannel);
   or, the first signaling is respectively transmitted once in the K sub-time resource pools.

19. The base station equipment of claim 16, wherein the index of the first antenna port group in the K antenna port groups is used to generate the first signaling.

20. The base station equipment of claim 16, further comprising:
   a second processor, transmitting a third wireless signal;
   wherein the first signaling is used to determine a fourth time resource pool; time domain resources occupied by the third wireless signal belong to the fourth time resource pool; a physical layer channel corresponding to the third wireless signal includes a PDSCH;
   or, a fourth transmitter, transmitting K1 reference signal/signals;
   wherein the K1 reference signal/signals is/are respectively transmitted by K1 antenna port/ports; the first signaling is used to determine at least one of the K1, the K1 antenna port/ports and air interface resource/resources occupied by the K1 reference signal/signals, or the index of the first antenna port group in the K antenna port groups is used to determine at least one of the air interface resource/resources occupied by the K1 reference signal/signals and reference signal (RS) sequence/sequences corresponding to the K1 reference signal/signals; the air interface resource/resources occupied by the K1 reference signal/signals includes/include one or more of time domain resources, frequency domain resources, and code domain resources.

* * * * *